United States Patent
Suzuki et al.

(10) Patent No.: US 8,194,210 B2
(45) Date of Patent: Jun. 5, 2012

(54) POLARIZING PLATE PROTECTIVE FILM, POLARIZING PLATE AND LIQUID CRYSTAL DISPLAY DEVICE

(75) Inventors: Takato Suzuki, Minami-Ashigara (JP); Shigeaki Nimura, Minami-Ashigara (JP); Hiroyuki Yoneyama, Minami-Ashigara (JP)

(73) Assignee: Fujifilm Corporation, Tokyo (JP)

( * ) Notice: Subject to any disclaimer, the term of this patent is extended or adjusted under 35 U.S.C. 154(b) by 180 days.

(21) Appl. No.: 11/924,495

(22) Filed: Oct. 25, 2007

(65) Prior Publication Data

US 2008/0100780 A1 May 1, 2008

(30) Foreign Application Priority Data

Oct. 26, 2006 (JP) .................. P2006-291349

(51) Int. Cl.
*G02F 1/1335* (2006.01)
(52) U.S. Cl. ........................................ 349/96
(58) Field of Classification Search ............... 349/96
See application file for complete search history.

(56) References Cited

U.S. PATENT DOCUMENTS

| 5,725,960 | A | | 3/1998 | Konishi et al. | |
|---|---|---|---|---|---|
| 6,485,798 | B1 | * | 11/2002 | Aminaka et al. | 428/1.1 |
| 7,006,174 | B2 | * | 2/2006 | Kusumoto et al. | 349/96 |
| 7,125,591 | B2 | * | 10/2006 | Nakajima et al. | 428/1.33 |
| 2003/0020843 | A1 | * | 1/2003 | Onishi et al. | 349/32 |
| 2006/0028601 | A1 | * | 2/2006 | Kawahara et al. | 349/117 |
| 2006/0269737 | A1 | * | 11/2006 | Yasuda et al. | 428/323 |
| 2007/0013843 | A1 | * | 1/2007 | Nishikouji et al. | 349/119 |
| 2007/0042189 | A1 | * | 2/2007 | Shirai et al. | 428/411.1 |
| 2008/0284957 | A1 | * | 11/2008 | Haruta et al. | 349/117 |
| 2009/0269514 | A1 | * | 10/2009 | Seki et al. | 428/1.31 |

FOREIGN PATENT DOCUMENTS

| JP | 5-247241 | A | | 9/1993 |
|---|---|---|---|---|
| JP | 6-313056 | A | | 11/1994 |
| JP | 7-97468 | A | | 4/1995 |
| JP | 8-12787 | A | | 1/1996 |
| JP | 8-57950 | A | | 3/1996 |
| JP | 2004-219620 | A | | 8/2004 |
| JP | 2005-010329 | | * | 1/2005 |
| JP | 2005-309219 | A | | 11/2005 |

OTHER PUBLICATIONS

Japanese Notification of Reasons for Refusal dated Oct. 11, 2011 for Japanese Application No. 2007-276466.

* cited by examiner

*Primary Examiner* — Phu Vu
(74) *Attorney, Agent, or Firm* — Birch, Stewart, Kolasch & Birch, LLP

(57) ABSTRACT

A polarizing plate protective film is provided and has a transparent substrate that is insoluble in a solvent having a dielectric constant of 10 or more and provided with an easily-adhesive layer and a hard coating layer on at least one side thereof in this order.

4 Claims, No Drawings

POLARIZING PLATE PROTECTIVE FILM, POLARIZING PLATE AND LIQUID CRYSTAL DISPLAY DEVICE

BACKGROUND OF THE INVENTION

1. Field of the Invention

The present invention relates to a protective film for a polarizing plate, and further to a polarizing plate and a liquid crystal display device each using such a protective film.

2. Description of Related Art

Triacetyl cellulose (TAC) has favorably been used for protective films for a polarizing plate. A polarizing plate generally has a polarizer between two protective films. Since TAC is pervious to moisture to a degree, when polarizing plates using TAC films are exposed to the atmosphere with high or low humidity for the long term, the TAC films become a cause of light leakage in a display having the polarizing plate and the like and there are cases where retention of display quality becomes impossible, notably in the display of the TN mode.

Reduction in thickness of TCA film in answer to the recent need for reduction in thickness of polarizing plate has sometimes led to degradation in moisture permeability and lowering of dimensional stability. It is difficult for a TCA film having a thickness below 40 μm in particular to impart sufficient durability to a polarizing plate.

SUMMARY OF THE INVENTION

An aspect of an illustrative, non-limiting embodiment of the invention is to provide a protective film for a polarizing plate, which not only avoids causing light leakage under conditions of high humidity or low humidity in a liquid crystal display device but also has excellent abrasion resistance, and further to provide a polarizing plate and a liquid crystal display device each using such a protective film.

The present inventors have found that adhesiveness is improved by forming an easily-adhesive layer for adhesion improvement between a protective film using a material insoluble in a solvent having a dielectric constant of 10 or more and a hard coating layer, and besides, especially good adhesiveness can be attained when an acrylic acid ester latex, a methacrylic acid latex or a styrene latex in particular is used in the easily-adhesive layer, thereby achieving an aspect of the invention.

An aspect of the invention offers the following structures.

(1) A protective film for a polarizing plate, including: a transparent substrate insoluble in a solvent having a dielectric constant of 10 or more; an easily-adhesive layer; and a hard coating layer in this order.

(2) The protective film as described in (1), wherein the transparent substrate is a cycloolefin film.

(3) The protective film as described in (1) or (2), wherein the easily-adhesive layer contains at least one selected from an acrylic acid ester latex, a methacrylic acid latex or a styrene latex.

(4) The protective film as described in any of (1) to (3), wherein at least one of the hard coating layer and the easily-adhesive layer contains an ultraviolet absorbent.

(5) The protective film as described in any of (1) to (4), wherein the easily-adhesive layer is provided on both sides of the transparent substrate.

(6) The protective film as described in any of (1) to (5), further including on the easily-adhesive layer an undercoating layer containing a hydrophilic polymer.

(7) The protective film as described in (6), wherein the undercoating layer further contains an ultraviolet absorbent.

(8) A polarizing plate including a polarizer and a protective film as described in any of (1) to (7).

(9) A liquid crystal display device including polarizing plates between which a liquid crystal cell is sandwiched, wherein at least one of the polarizing plates is a polarizing plate as described in (8).

More specifically, the invention offers various aspects as detailed below.

(1) A protective film for a polarizing plate, including: a transparent substrate insoluble in a solvent having a dielectric constant of 10 or more; an easily-adhesive layer, and a hard coating layer in this order.

(2) The protective film as described in (1), wherein the transparent substrate is a cycloolefin film.

(3) The protective film as described in (1) or (2), wherein the easily-adhesive layer contains at least one selected from an acrylic acid ester latex, a methacrylic acid latex or a styrene latex.

(4) The protective film as described in any of (1) to (3), whose total haze is from 10% to 80%.

(5) The protective film as described in any of (1) to (4), whose surface haze is from 0.3% 1 to 70%.

(6) The protective film as described in any of (1) to (5), whose internal haze is from 10% to 80%.

(7) The protective film as described in any of (1) to (6), whose transmittance at 380 nm is from 0 to 50% and whose transmittance at 600 nm is from 80% to 100%.

(8) The protective film as described in any of (1) to (7), wherein the transparent substrate has a water content of 1% or less.

(9) The protective film as described in any of (1) to (8), wherein the transparent substrate has a film thickness of 5 to 200 μm.

(10) The protective film as described in any of (1) to (9), wherein the transparent substrate has a glass transition temperature of 80° C. or more.

(11) The protective film as described in any of (1) to (10), wherein the transparent substrate has at least one surface having undergone corona discharge treatment.

(12) The protective film as described in any of (1) to (11), wherein the transparent substrate has at least one surface having undergone glow discharge treatment.

(13) The protective film as described in any of (1) to (12), wherein the easily-adhesive layer is provided on both sides of the transparent substrate.

(14) The polarizing plate protective film as described in any of (1) to (13), wherein the easily-adhesive layer has a thickness of 50 to 1,000 nm.

(15) The protective film as described in any of (1) to (14), wherein the easily-adhesive layer contains an ultraviolet absorbent.

(16) The protective film as described in any of (1) to (15), wherein an undercoating layer containing a hydrophilic polymer is further formed on the easily-adhesive layer.

(17) The protective film as described in any of (1) to (16), wherein the undercoating layer has a thickness of 50 to 1,000 nm.

(18) The protective film as described in (16) or (17), wherein the undercoating layer contains an ultraviolet absorbent.

(19) The protective film as described in any of (1) to (18), wherein the easily-adhesive layer contains a conductive metal oxide.

(20) A polarizing plate including a polarizer and a protective film as described in any of (1) to (19).

(21) The polarizing plate as described in (20), further including another protective film sandwiching the polarizer with the protective film as described in any of (1) to (19), the other protective film including a film formed mainly of a cellulose ester film.

(22) The polarizing plate as described in (20) or (21), wherein the other protective film is sandwiched has a viewing angle compensation function.

(23) The polarizing plate as described in any of (20) to (22), wherein the other protective film has an optically anisotropic layer.

(24) A liquid crystal display device provided with two polarizing plates between which a liquid crystal cell is sandwiched, wherein at least one of the polarizing plates is a polarizing plate as described in any of (20) to (23).

(25) The liquid crystal display device as described in (24), further including a brightness-enhancement film.

(26) The liquid crystal display device as described in (24) or (25), wherein the polarizing plate as described in any of (20) to (23) is provided on only the visual side.

(27) The liquid crystal display device as described in (26), wherein the brightness-enhancement film and a polarizing plate protective film adjacent thereto are brought into close contact with each other.

(28) The liquid crystal display device as described in any of (24) to (27), whose display mode is a TN mode.

DETAILED DESCRIPTION OF THE INVENTION

A protective film according to an aspect of the invention can avoid causing light leakage under conditions of high humidity or low humidity in liquid crystal display devices provided with polarizing plates utilizing the present protective films, and besides, it can ensure satisfactory abrasion resistance and excellent adhesiveness. Although reasons why such excellent effects are produced in the invention are uncertain, effects of the invention are supposed to originate from both the use of a transparent substrate having a specified solubility, which ensures formation of a polarizing plate with low moisture permeability and reduced susceptibility to moisture changes, and the application of an easily-adhesive layer, which yields a remarkable improvement in adhesion between the transparent substrate and a hard coating layer.

Even when an ultraviolet absorbent is incorporated in the easily-adhesive layer and/or the hard coating layer, bleeding thereof does not occur so long as the easily-adhesive layer is formed using an acrylic acid ester latex, a methacrylic acid latex or a styrene latex. The ultraviolet-absorbent bleed occurs on the interface between the hard coating layer and the substrate or on the interface between the hard coating layer and the air, and improvement thereof is achieved by providing the easily-adhesive layer formed from the latex as specified above between the hard coating layer and the substrate. Although the reason why such an effect is produced is uncertain, the effect is supposed to be traceable to good compatibility between the easily-adhesive layer and the ultraviolet absorbent.

Exemplary embodiments of the invention are described below in greater detail.

A protective film for a polarizing plate according to an embodiment of the invention has on at least one side of a transparent substrate insoluble in a solvent with a dielectric constant of 10 or more (hereinafter referred simply to as "a substrate" in some cases) an easily-adhesive layer and a hard coating layer which are provided in this order.

In an embodiment of the invention, the hard coating layer, the easily-adhesive layer or both may contain an ultraviolet absorbent, as is described hereinafter.

<General Constitution>

In the first place, a layer structure of a protective film according to an exemplary embodiment of the invention is described.

Each of the present protective films has a transparent substrate on at least one side of which an easily-adhesive layer and a hard coating layer are provided.

In another exemplary embodiment of the invention, the easily-adhesive layer is provided on both sides of the transparent substrate. And an undercoating layer may be provided on the easily-adhesive layer.

Furthermore, other layers as described hereinafter may be provided above or below the hard coating layer as appropriate.

<<Transparent Substrate>>

A substrate used in an embodiment of the invention is a transparent substrate insoluble in a solvent with a dielectric constant of 10 or more.

The term "dielectric constant" as used herein is a value determined by impedance measurement, and the expression of "a substrate insoluble in a solvent with a dielectric constant of 10 or more, preferably 10 to 80" means that the substrate neither swells nor dissolves in such a solvent.

Examples of a solvent with a dielectric constant of 10 or more include methyl ethyl ketone, acetone, methyl isobutyl ketone, methyl acetate, ethyl acetate, butyl acetate, methanol, ethanol and isopropanol.

Examples of a transparent substrate as defined above include a cycloolefin polymer substrate, a cycloolefin copolymer substrate and a polynorbornene substrate.

More specifically, the transparent substrate is preferably a cycloolefin film. The cycloolefin film is a film made from a polymer having an alicyclic structure.

The polymer having alicyclic structures is a polymer containing an alicyclic structure in a repeating unit thereof, and both a polymer containing an alicyclic structure in its main chain and a polymer containing an alicyclic structure in its side chain can be used.

Although examples of an alicyclic structure include cycloalkane structures and cycloalkene structures, cycloalkane structures are preferable in terms of thermal stability and so on. The number of carbon atoms constituting such an alicyclic structure, though there is no particular limit thereto, is generally from 4 to 30, preferably from 5 to 20, far preferably from 5 to 15. When the number of carbon atoms constituting each alicyclic structure is in such a range, high heat resistance and excellent flexibility can be imparted to polymer films concerned.

The proportion of repeating units with alicyclic structures in a polymer containing the alicyclic structures, though may be chosen appropriately so long as it meets the solubility requirement, is generally 50 mass % (weight %) or more, preferably 70 mass % or more, far preferably 90 mass % or more. A polymer containing repeating units with alicyclic structures in a proportion of 50 mass % or more is suitable because it suffers no degradation in heat resistance. Additionally, repeating units, other than repeating units with alicyclic structures, in a polymer containing the alicyclic structures are chosen as appropriate to the polymer's application.

Examples of a polymer containing alicyclic structures include (i) norbornene polymers, (ii) monocyclic cycloolefin polymers, (iii) cyclic conjugated diene polymers and (iv) vinylcycloaliphatic hydrocarbon polymers and hydrogenation products thereof. Of these polymers, norbornene polymers are favorable in terms of transparency and formability.

Examples of norbornene polymers include ring-opening polymers of norbornene monomers, ring-opening copolymers of norbornene monomers and other ring-opening polymerizable monomers, hydrogenation products of such polymers and copolymers, addition polymers of norbornene monomers, and addition copolymers of norbornene monomers and other copolymerizable monomers. Of these polymers, hydrogenation products of (co)polymers produced by ring-opening polymerization of norbornene monomers are especially preferred in terms of transparency.

Examples of norbornene monomers include bicyclo[2.2.1]hepto-2-ene (trivial name: norbornene), tricyclo[4.3.0.1$^{2.5}$]deca-3,7-diene (trivial name: cyclopentadiene), 7,8-benzotricyclo[4.3.0.1$^{2.5}$]deca-3-ene (trivial name: methanotetrahydrofluorene), tetracyclo[4.4.0.1$^{2.5}$.1$^{7.10}$]dodeca-3-ene (trivial name: tetracyclododecene) and derivatives of these compounds, such as those obtained by introduction of substituents into their respective rings. Examples of substituents which can be introduced therein include alkyl groups, alkenyl groups, alkoxycarbonyl groups and a carboxyl group. Additionally, two or more of these substituents, which may be the same or different, can be attached to each individual ring. Norbornene monomers can be used alone or in combination with two or more thereof.

Examples of other monomers capable of undergoing ring-opening polymerization with norbornene monomers include monocyclic olefins, such as cyclohexene, cycloheptene and cyclooctene, and derivatives thereof; and cyclic conjugated dienes, such as cyclohexadiene and cycloheptadiene, and derivatives thereof.

Ring-opening polymerization of norbornene monomers and ring-opening copolymerization of norbornene monomers and other monomers copolymerizable therewith can be effected by polymerizing those monomers in the presence of a ring-opening polymerization catalyst thereby respectively yielding the intended polymers and copolymers. As the ring-opening polymerization catalyst, heretofore known catalysts can be used.

Examples of other monomers addition-polymerizable with norbornene monomers include α-olefins containing 2 to 20 carbon atoms per molecule, such as ethylene and propylene, and derivatives thereof; cycloolefins, such as cyclobutene and cyclopentene, and derivatives thereof, and non-conjugated dienes, such as 1,4-hexadiene. These monomers can be used alone or in combination with two or more thereof. Of these monomers, α-olefins are preferred over the others, and ethylene is preferable by far.

Addition polymers of norbornene monomers, and addition copolymers of norbornene monomers and other monomers copolymerizable therewith can be produced by polymerizing those monomers in the presence of an addition polymerization catalyst. As the addition polymerization catalyst, heretofore known catalysts are usable.

Hydrogenation products of polymers produced by ring-opening polymerization of norbornene monomers or those of copolymers produced by ring-opening copolymerization of norbornene monomers and other ring-opening polymerizable monomers are obtained by hydrogenating C—C unsaturated bonds in the polymers or the copolymers, preferably at least 90% thereof, with the aid of a known hydrogenation catalyst.

As the norbornene polymers, commercially available ones, such as ZEONOR and ZEONEX, trade names, produced by Zeon Corporation; ARTON, trade name, produced by JSR Corporation; OPTOREZ, trade name, produced by Hitachi Chemical Co., Ltd.; and APEL, trade name, produced by Mitsui Chemicals, Inc., can be used.

Examples of (ii) monocyclic cycloolefin polymers include addition polymers of cyclohexene, cycloheptene and cyclooctene.

Examples of (iii) cyclic conjugated diene polymers include polymers produced by 1,2-addition polymerization or 1,4-addition polymerization of cyclic conjugated diene monomers, such as cyclopentadiene and cyclohexadiene.

Vinylcycloaliphatic hydrocarbon polymers (iv) are polymers having repeating units derived from vinylcycloalkanes or vinylcycloalkenes. Examples of the vinylcycloaliphatic hydrocarbon polymers include polymers of vinylcycloaliphatic hydrocarbon compounds, such as vinylcyclohexane; and hydrogenation products obtained by hydrogenating aromatic ring moieties of polymers of vinylaromatic hydrocarbon compounds, such as styrene and α-methylstyrene. Alternatively, the vinylcycloaliphatic hydrocarbon polymers may be random copolymers or block copolymers of vinylcycloaliphatic hydrocarbon compounds, vinylaromatic hydrocarbon compounds and other monomers copolymerizable with those monomeric compounds.

Examples of hydrogenation products of (i) norbornene polymers, those of (ii) monocyclic cycloolefin polymers, those of (iii) cyclic conjugated diene polymers and those of (iv) vinylcycloaliphatic hydrocarbon polymers include polymers produced by adding hydrogen to unsaturated groups in the individual polymers recited above.

Polymers preferred in an embodiment of the invention are an addition polymeric or copolymeric poly(cycloolefin) containing at least one kind of repeating units represented by the following formula (II) and an addition polymeric or copolymeric poly(cycloolefin) further containing at least one kind of repeating units represented by the following formula (I) on an as needed basis. In addition, a ring-opening polymer or copolymer containing at least one kind of cyclic repeating units represented by the following formula (III) is also suitable for use in the invention.

Formula (I):

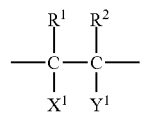

Formula (II):

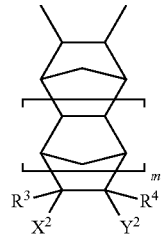

Formula (III)

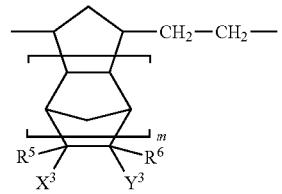

In formulae (I), (II) and (III), m represents an integer of 0 to 4. Each of substituents $R^1$ through $R^6$ independently represents a hydrogen atom or a 1-10C hydrocarbon group. Each of substituents $X^1$ through $X^3$ and $Y^1$ through $Y^3$ independently represents a hydrogen atom, a 1-10C hydrocarbon group, a halogen atom, a halogenated 1-10C hydrocarbon groups —$(CH_2)_nCOOR^{11}$, —$(CH_2)_nOCOR^{12}$, —$(CH_2)_nNCO$, —$(CH_2)_nNO_2$, —$(CH_2)_nCN$, —$(CH_2)_nCONR^{13}R^{14}$, —$(CH_2)_nNR^{13}R^{14}$, —$(CH_2)_nOZ$ or —$(CH_2)_nW$, or a combination of $X^1$ with $Y^1$, $X^2$ with $Y^2$ or $X^3$ with $Y^3$ forms a group represented by (—$CO)_2O$ or (—$CO)_2NR^{15}$. Herein, $R^{11}$, $R^{12}$, $R^{13}$, $R^{14}$ and $R^{15}$ each independently represent a hydrogen atom or a 1-20C hydrocarbon group, Z represents a hydrocarbon group or a halogenated hydrocarbon group, W represents $SiR^{16}_pD_{3-p}$ (wherein $R^{16}$ represents a 1-10C hydrocarbon group, D represents a halogen atom, —$OCOR^{16}$ or —$OR^{16}$, and p represents an integer of 0 to 3), and n represents an integer of 0 to 10.

The weight-average molecular weight of polymers having the alicyclic structures as illustrated above, as measured by gel permeation chromatography using as solvent cyclohexane (or toluene in the case of polymer resin insoluble in cyclohexane) and calculated in terms of polyisoprene or polystyrene, is generally from 10,000 to 300,000, preferably from 20,000 to 200,000. The polymers having their molecular weight in such a range are suitable for formation of transparent substrates because the transparent substrates formed can have a high degree of balance between mechanical strength and moldability.

The glass transition temperatures of polymers having the alicyclic structures as illustrated above, though may be chosen as appropriate to applications of the polymers, are preferably in a range of 80° C. or more, far preferably from 100° C. to 250° C. When the polymers have their glass transition temperatures in such a range, the transparent substrates formed from them undergo neither deformations nor stresses even when they are used under high temperatures, and they have excellent durability.

The substrates made with polymers having the alicyclic structures as illustrated above can be obtained by forming the polymers into films in accordance with any of forming methods heretofore known.

Examples of a method of forming a polymer into film include solution casting methods and melt extrusion forming methods. Of these methods, melt extrusion forming methods are preferable in the sense that they can reduce volatile matter contents in the films formed and unevenness of film thickness, and from the viewpoint of productivity. In the melt extrusion forming methods, a method of using a die such as a T-die and an inflation method are included, and the method of using a T-die is preferred in terms of excellent thickness accuracy.

When the method of using a T-die is adopted as a film forming method, it is appropriate that the melting temperature in an extruder equipped with a T-die be adjusted to a temperature 80° C. to 180° C. higher, preferably 100° C. to 150° C. higher, than the glass transition temperature of the polymer used. There are possibilities that unduly low melting temperatures in an extruder depress the flowability of the polymer used, while unduly high melting temperatures in an extruder degrade the quality of the polymer used.

In addition, the polymer used is preferably subjected to preliminary drying before it is formed into film. The preliminary drying is carried out, e.g., by forming a raw material into pellets and using a hot-air dryer. The suitable drying temperature is 100° C. or higher, and the suitable drying time is 2 hours or longer. By carrying out the preliminary drying, the volatile matter content in the film formed can be reduced. In addition, the polymer extruded can be prevented from foaming.

It is preferable that the polymer used has saturated water absorption less than 0.05%. By use of the polymer laving saturated water absorption less than 0.05%, there occurs neither quality degradation nor productivity reduction resulting from release of water at the time of formation of layers on the film formed. In addition, a trouble that the transparent plastic film extends and contracts by absorption of moisture and causes delamination of layers stacked thereon can be avoided. When the polymer is used in a large-screen liquid crystal display device, degradation in image quality resulting from dimensional changes by moisture absorption can be dissolved.

Furthermore, it is preferable that the polymer having alicyclic structures used for cycloolefin film has a glass transition temperature (Tg) of 80° C., or higher, preferably 90° C. or higher. When the polymer used has a glass transition temperature lower than 80° C., there may be cases where the films formed are inferior in dimensional stability under hot-and-humid conditions. Tg is determined from the peak of tan δ in measurement of dynamic viscoelasticity.

To the cycloolefin films, easily-slipping property can also be imparted as required. The method for imparting easily-slipping property is not limited to particular one, but a method of adding inert inorganic particles to cycloolefin, namely external addition of particles, a method of precipitating a catalyst added at the time of synthesis of cycloolefin, namely precipitation of internal particles, or a method of coating a surfactant or the like on the film surface can be generally adopted.

Alternatively, functional layers, such as an antistatic layer, an easily-slipping layer, an adhesive layer and a barrier layer, may be coated before and/or after stretching in the course of the film formation. Herein, varieties of surface treatment, such as corona discharge treatment, atmospheric-pressure plasma treatment and chemical treatment, can be given as required.

Physical properties of a transparent substrate used in an embodiment of the invention are described below.

<Film Thickness>

The thickness of the transparent substrate is from 5 to 200 μm, preferably from 5 to 100 μm, far preferably from 40 to 100 μm.

<Moisture Permeability>

The moisture permeability of the transparent substrate is preferably 700 g/m²·day or below, far preferably 300 g/m²·day or below, especially preferably 100 g/m²·day or below.

Such low moisture permeability of a transparent substrate contributes to reduction in tendencies of troubles, such as light leakage and a drop in polarization degree, to occur, whether in high-humidity or low-humidity surroundings, when the transparent substrate is made into a polarizing plate and used in a liquid crystal display device.

<Elasticity Modulus>

The elasticity modulus of a transparent substrate used is preferably from 3 to 7 GPa.

When the transparent substrate having its elasticity modulus in such a range is made into a polarizing plate and used in a liquid crystal display device, tendencies of troubles, such as light leakage and a drop in polarization degree, to occur can be reduced whether in high-humidity or low-humidity surroundings.

<Moisture Content>

The moisture content of a transparent substrate used is preferably 1% or below.

When the transparent substrate having its moisture content in such a range is made into a polarizing plate and used in a liquid crystal display device, tendencies of troubles, such as light leakage and a drop in polarization degree, to occur can be reduced whether in high-humidity or low-humidity surroundings.

The transparent substrate may be a single (single-layer) film formed of a cycloolefin film as recited above, or may be a multilayer film including not only at least one layer formed of a cycloolefin film as recited above but also a plurality of resin layers within the scope of no impairment of the present effects. For instance, when the cycloolefin layer is denoted by a letter A and other resin layers are denoted by letters B and C, the transparent substrate can have a layer structure of A/B, A/B/A, B/A/B or B/A/C. Of course, the transparent substrate can also have a layer structure made up of four or more layers. By designing a transparent substrate to have a multilayer structure as mentioned above, for example, as a layered product including films high in strength and water barer as its core and outer layers, two or more functions can be imparted at the same time.

Furthermore, when fine particles including a matting agent for imparting slipping properties are added, the effect thereof can be produced by addition to only the outermost layer, so it becomes possible to impart the intended functions without suffering degradation in transparency and so on.

<Fine Particles Capable of Being Added>

Fine particles capable of being added are not limited to particular ones, but examples thereof include fine particles of an inorganic compound and fine particles of an organic compound.

Suitable examples of such an inorganic compound include silicon-containing compounds, silicon dioxide, aluminum oxide, zirconium oxide, calcium carbonate, talc, clay, calcined kaolin, calcined calcium silicate, hydrated calcium silicate, aluminum silicate, magnesium silicate and calcium phosphate. Of these compounds, silicon-containing inorganic compounds and zirconium oxide are preferred over the others, and silicon dioxide is used to particular advantage.

As the fine particles of silicon dioxide, products on the market, such as AEROSIL series R972, R972V, R974, R812, 200, 200V, 300, R202, OX50 and TT600 (which are products of Nippon Aerosil Co., Ltd.), can be used.

As the fine particles of zirconium oxide, products on the market, such as AEROSIL R976 and AEROSIL R811 (which are products of Nippon Aerosil Co., Ltd.), can be used.

Suitable examples of such an organic compound as mentioned above include polymers such as silicone resins, fluorocarbon resins and acrylic resins. Of these polymers, silicone resins can be used to advantage.

Of the silicone resins, those having three-dimensional network structures are preferred. For example, commercially available products having trademarks TOSPEARL 103, TOSPEARL 105, TOSPEARL 108, TOSPEARL 120, TOSPEARL 145, TOSPEARL 3120 and TOSPEARL 240 (which are products of Toshiba Silicones Co., Ltd.) can be used.

Moreover, improvement of adhesiveness in the present polarizing plate protective film can be attained by giving corona discharge treatment or/and glow discharge treatment to at least one side of the transparent substrate. Stacking of an easily-adhesive layer as described blow after corona discharge treatment or/and glow discharge treatment is beneficial because adhesion between a hard coating layer and the transparent substrate can be further enhanced.

To the corona discharge and the glow discharge treatment, general techniques heretofore known can be applied without any particular restriction.

<<Easily-Adhesive Layer>>

On at least one side of the transparent substrate, an easily-adhesive layer is provided between the transparent support and a hard coating layer.

The easily-adhesive layer is a layer provided in order to enhance adhesion between the transparent substrate and the hard coating layer. The easily-adhesive layer has no particular restriction on its forming material so long as the material can improve adhesion between the hard coating layer and the transparent substrate formed of a cycloolefin film and so on.

Suitable examples of the easily-adhesive layer include a layer containing a urethane polymer, a silicone layer containing a silicone compound having reactive functional groups, a layer containing an olefin resin and a layer made with an ester latex, a methacrylic acid latex or a styrene latex. Formation of a layer containing an olefin resin or an easily-adhesive layer made with an ester latex, a methacrylic acid latex or a styrene latex is further suitable. And it is especially advantageous that the easily-adhesive layer is formed with at least one kind of latex selected from an acrylic acid ester latex, a methacrylic acid latex or a styrene latex.

Now, olefin resins, silicone resins and latexes which can be suitably used as forming materials of the easily-adhesive layer are illustrated.

<Olefin Resin>

Olefin resins are suitable for use as a forming material of the easily-adhesive layers. No particular restriction is imposed on the olefin resins so tong as they are polymers of compounds having olefinic double bonds and containing carbon, hydrogen and oxygen or nitrogen as each individual constituent elements. Examples of such a compound include ethylene, propylene, butadiene and styrene. Each polymer may be a homopolymer or a copolymer of two or more of those compounds. When a compound having a highly polar group in particular, such as a hydroxyl group, a carboxyl group, an amino group, an isocyanate group, a nitro group or a carbonyl group, in its side chain or terminal is used, the easily-adhesive layer formed offers high adhesiveness to both the substrate and a hard coating layer. A coating solution for the easily-adhesive layer including an olefin resin can be prepared by dissolving the olefin resin in a suitable solvent with the aid of an appropriate mixing device, such as a homomixer.

The solvent suitably used therein is not limited to particular ones, but examples thereof can include ketones, such as methyl ethyl ketone, acetone and methyl isobutyl ketone; esters, such as methyl acetate, ethyl acetate and butyl acetate; aromatic compounds, such as toluene and xylene; ethers, such as diethyl other and tetrahydrofuran; and alcohol compounds, such as methanol, ethanol and isopropanol. In the special case of using a solvent in which cycloolefin film can dissolve or swell, including an aromatic solvent, such as toluene or xylene, a chlorinated hydrocarbon solvent, such as dichloromethane or carbon tetrachloride, a hydrocarbon solvent, such as n-hexane or cyclohexane, and a ketone solvent, such as cyclohexanone or methyl isobutyl ketone, the interaction of the easily-adhesive layer formed and the cycloolefin film is strengthened and thereby high adhesiveness is effected, and besides, the border between these layers becomes blurry and thereby interference fringes come to disappear with ease. The concentration of solid ingredients in the coating solution is of the order of, say, 5 to 70%.

Coating the easily-adhesive layer including an olefin resin on a cycloolefin film in an embodiment of the invention can be cared out using a traditional coating technique, such as a technique utilizing a slot coater, a spin coater, a roll coater, a curtain coater or screen printing.

It is appropriate that the thickness of the easily-adhesive layer including an olefin resin be adjusted to a range of 0.05 to 10 μm. This is because the easily-adhesive layer having a thickness below 0.05 μm cannot produce sufficient adhesiveness, while that having a thickness beyond 10 μm is seriously detrimental to the function of a hard coating. The thickness is preferably from 0.1 to 5 μm, far preferably from 0.5 to 2.0 μm. Under such conditions, high adhesion and high surface hardness can be achieved at the same time.

<Silicone Resin>

As another suitable example of the easily-adhesive layer, mention may be made of an easily-adhesive layer containing a silicone compound having reactive functional groups. Examples of a silicone compound having reactive functional groups, which is suitably used in the easily-adhesive layer, include alkoxysilanol compounds containing isocyanate groups, alkoxysilanol compounds containing amino groups, alkoxysilanol compounds containing mercapto groups, alkoxysilanol compounds containing carboxyl groups, alkoxysilanol compounds containing epoxy groups, alkoxysilanol compounds containing vinylic unsaturated groups, and alkoxysilanol compounds containing halogen atoms. Of such a wide variety of alkoxysilanol compounds, alkoxysilanol compounds containing amino groups are preferred over the others.

To the silicone compounds having reactive functional groups as recited above, other additives may be added. Examples of the additives include tackiness imparting agents, such as terpene resin, phenol resin, terpene-phenol resin, rosin resin and xylene resin, and stabilizers, such as an antioxidant and a heat-resisting stabilizer.

Additionally, adhesion between the film containing a cycloolefin resin and the silicone layer containing a silicone resin having reactive functional groups can be enhanced by giving in advance the surface of the cycloolefin resin-containing film surface treatment, such as corona treatment, plasma treatment or/and low-UV treatment.

Furthermore, to the silicone compounds having reactive functional groups may be added titanium catalysts or tin catalysts in order to enhance reactivity of those silicone compounds. The addition of such catalysts can strengthen the adhesion between a hard coating layer and the cycloolefin resin-containing film.

The silicone compound having reactive functional groups is applied to the surface of film containing a cycloolefin resin and subjected to drying in usual manners, and thereby formed into a silicone layer.

At its application, the silicone compound having reactive functional groups may be subjected to dilution with a solvent. The solvent used therein has no particular restriction, but examples thereof can include alcohol compounds, such as isopropyl alcohol, ethanol, methanol and butanol.

When the easily-adhesive layer contains such a silicon compound, the dry thickness thereof is generally from 1 to 100 nm, preferably from 10 to 50 nm. The silicone layer retains good adhesiveness and does not give rise to reduction in transparency of the protective film so long as the thickness thereof is in the range of 1 to 100 nm, so adjustment to this range is suitable.

<Latex>

As still another suitable example of the easily-adhesive layer, mention may be made of an easily-adhesive layer formed from at least one latex selected from an acrylic acid ester latex, a methacrylic acid latex or a styrene latex. In other words, the easily-adhesive layer in the invention can be formed with such a (co)polymer latex. The use of the easily-adhesive layer formed from such a latex is favorable since an ultraviolet absorbent incorporated in the hard coating layer and/or the easily-adhesive layer is resistant to bleeding.

In addition, the latex may be a copolymer latex obtained by subjecting a monomer mixture of (a) a diolefin monomer, (b) a vinyl monomer and (c) at least one kind of monomer having two or more vinyl, acryloyl, methacryloyl or allyl groups per molecule to emulsion polymerization in the presence of (d) polymerization chain transfer agents including α-methylstyrene dimer and otter polymerization chain transfer agents in an aqueous medium.

Examples of (a) a diolefin monomer as one constituent monomer of the copolymer include conjugated dienes, such as butadiene, isoprene and chloroprene. Of these dienes, butadiene is used to particular advantage.

As to (b) a vinyl monomer which is the second constituent monomer of the copolymer used in an embodiment of the invention, though any monomer may be used as far as it has a vinyl group, suitable examples thereof can include styrene, acrylonitrile, methyl methacrylate, vinyl chloride, vinyl acetate and derivatives of these vinyl compounds, alkyl esters of acrylic acid, acrylamide, methacrylamide, acrolein, methacrolein, glycidyl acrylate, glycidyl methacrylate, 2-hydroxyethyl acrylate, 2-hydroxyethyl methacrylate, allyl acrylate, allyl methacrylate, N-methylolated acrylamide, N-methylolated methacrylamide, vinyl isocyanate and allyl isocyanate. In an embodiment of the invention, however, it is preferable that the vinyl monomer (b) is predominantly composed of an acrylic acid ester, a methacrylic acid ester, styrene or a styrene derivative.

Examples of the styrene derivative can include methylstyrene, dimethylstyrene, ethylstyrene, diethylstyrene, isopropylstyrene, butylstyrene, hexylstyrene, cyclohexylstyrene, decylstyrene, benzylstyrene, chloromethylstyrene, trifluoromethylstyrene, ethoxymethylstyrene, acetoxymethylsyrene, methoxystyrene, 4-methoxy-3-methylstyrene, dimethoxystyrene, chlorostyrene, dichlorostyrene, trichlorostyrene, tetrachlorostyrene, pentachlorostyrene, bromostyrene, dibromostyrene, iodostyrene, fluorostyrene, trifluorostyrene, 2-bromo-4-trifluoromethylstyrene, 4-fluoro-3-trifluoromethylstyrene and methyl vinylbenzoate.

The suitable of acrylic acid esters are acrylic acid alkyl esters, glycidyl (meth)acrylate and 2-hydroxyethyl (meth)acrylate.

Examples of (c) a monomer having two or more vinyl, acryloyl, methacryloyl or ally groups per molecule, which is the third constituent monomer of the copolymer used in an embodiment of the invention, can include the so-called cross-linking agents added at the time of normal polymerization of vinyl monomers, namely divinylbenzene, 1,5-hexadiene-3-yne, hexatriene, divinyl ether, divinyl sulfone, diallyl phthalate, diallyl carbinol, diethylene glycol dimethacrylate, trimethylolpropane methacrylate, trimethylolpropane dimethacrylate and the like.

The content of units derived from (a) a diolefin monomer in the copolymer according to an embodiment of the invention is preferably from 10 to 60 mass %, especially preferably from 15 to 40 mass %. The proportion of units derived from (b) a vinyl monomer in the copolymer is preferably from 90 to 40 mass %, especially preferably from 70 to 40 mass %. The contents of units derived from (c) a monomer having at least two vinyl, acryloyl, methacryloyl or allyl groups per molecule is preferably from 0.01 to 10 mass %, especially preferably from 0.1 to 5 mass %, of the total content of units derived from (a) a diolefin monomer and (b) a vinyl monomer.

The α-methylstyrene dimer included in (d) polymerization chain transfer agents has isomers, namely (i) 2,4-diphenyl-4-methyl-1-pentene, (ii) 2,4-diphenyl-4-methyl-2-pentene and (iii) 1,1,3-dimethyl-3-phenylindane. As to the isomer composition of the α-methylstyrene dimer, it is preferable that the component (i) content is 40 mass % or more and the component (ii) and/or (iii) content is 60 mass % or less, it is preferable by far that the component (i) content is 50 mass % or more and the component (ii) and/or (iii) content is 50 mass % or less, and it is especially preferable that the component (i) content is 70 mass % or more and the component (ii) and/or (ii) content is 30 mass % or less. The chain transfer effect is enhanced with increase in the content of the component (i) in the composition.

The α-methylstyrene dimer may contain impurities, such as α-methylstyrene remaining unreacted, α-methylstyrene oligomers other than the components (i), (ii) and (iii) and α-methylstyrene polymer, within the scope of no impairment of effects of the invention. In the case of using α-methylstyrene dimer, synthetic α-methylstyrene dimer in an unpurified state may be used so long as it is not detrimental to effects of the invention.

The proportion of α-methylstyrene dimer in the total polymerization chain transfer agents (d) is from 2 to 110 mass %, preferably from 3 to 100 mass %, far preferably from 5 to 95 mass %. As far as the proportion of α-methylstyrene dimer in (d) is 2 mass % or more, copolymer latexes having both high adhesive strength and excellent blocking-resistant properties can be obtained. In addition, the combined use of α-methylstyrene dimer and other polymerization chain transfer agents can increase the reactivity at the time of polymerization.

The amount of polymerization chain transfer agents (d) used is from 0.3 to 10 parts by mass, preferably from 0.5 to 7 parts by mass, per 100 parts by mass of monomer mixture. Since poor blocking resistance is avoided so long as the amount of polymerization chain transfer agents (d) used is 0.3 parts by mass or more and there occurs no reduction in adhesion strength so long as the amount of (d) used is 10 parts by mass or below, the usage in the aforesaid range is favorable. In addition, it is appropriate that the amount of α-methylstyrene dimer used be from 0.1 to 5 parts by mass per 100 parts by mass of monomer mixture.

As to the polymerization chain transfer agents (d), polymerization chain transfer agents usable in combination with α-methylstyrene dimer are polymerization chain transfer agents known to be used in general emulsion polymerization. Examples of such polymerization chain transfer agents include mercaptans, such as octyl mercaptan, n-dodecyl mercaptan, t-dodecyl mercaptan, n-hexadecyl mercaptan, n-tetradecyl mercaptan and t-tetradecyl mercaptan; xanthogene disulfides, such as dimethylxanthogene disulfide, diethylxanthogene disulfide and diisopropylxanthogene disulfide; thiuram disulfides, such as tetramethylthiuram disulfide, tetraethylthiuram disulfide and tetrabutylthiuram disulfide; halogenated hydrocarbons, such as carbon tetrachloride and ethylene bromide; hydrocarbons, such as pentaphenylethane; and acrolein, methacrolein, allyl alcohol, 2-ethylhexyl thioglycolate, terpinolene, α-terpinene, γ-terpinene and dipentene. These compounds can be used alone or combinations of two or more thereof. The preferred among them are mercaptans, xanthogene disulfides, thiuram disulfides and carbon tetrachloride.

The copolymer latex for use in the invention can be produced according to the same method as an emulsion polymerization method heretofore known, except that the monomer mixture and the polymerization chain transfer agents as recited above are used. More specifically, emulsion polymerization is performed in an aqueous medium to which the monomer mixture, a polymerization initiator, an emulsifier, the polymerization chain transfer agents and so on are added, thereby producing the copolymer latex. The solids content in the copolymer latex is preferably from 3 to 15 mass %.

The thickness of the easily-adhesive layer formed by application of the copolymer latex is preferably from 50 to 1,000 nm, far preferably from 50 to 300 nm, further preferably from 50 to 200 nm.

Furthermore, it is advantageous for an embodiment of the invention to use the copolymer latex in combination with a dichloro-s-triazine cross-linking agent. The combined use of the copolymer latex and a dichloro-s-triazine cross-linking agent yields a remarkable improvement in adhesion power even under any of ordinary, high and low humidity conditions, and no cracks appear under low humidity conditions, nod besides, the combined use can have excellent effects upon antistatic properties, abrasion resistance, water resistance and solvent resistance.

As to the dichloro-s-triazine cross-linking agent, compounds represented by the following formula (2) and/or compounds represented by the following formula (3) are preferably used in the invention.

Formula (2):

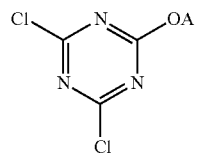

In formula (2), A represents an alkyl group, a cycloalkyl group, an aryl group, an aralkyl group, a metal atom or a hydrogen atom.

Formula (3):

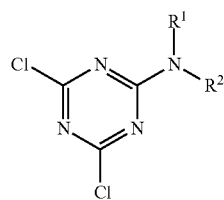

In formula (3), $R^1$ and $R^2$ each represent a hydrogen atom, an alkyl group, a cycloalkyl group, an aryl group, an aralkyl group or —$NHR^3$ (wherein $R^3$ is an alkyl group or an acyl group). Alternatively, $R^1$ and $R^2$ may combine to form a 5- or 6-membered ring containing O, S or N—$R^4$ (wherein $R^4$ represents an alkyl group).

These dichloro-s-triazine cross-linking agents can be added to the monomer mixture in an amount of 0.1 to 100 parts by mass (parts by weight). As long as the dichloro-s-triazine cross-linking agents are added in an amount of 0.1 parts by mass or more, there are no problems in terms of not only enhancement of adhesive power but also effects upon cracking prevention under low humidity conditions, antistatic properties, abrasion resistance, water resistance and solvent resistance. On the other hand, it is suitable to add the dichloro-s-triazine cross-linking agents in au amount of 100 parts by mass or below because so long as the addition amount is in such a range, cases are avoided where the cross-linking agents remaining unreacted in large quantity migrate into a gelatin layer as an upper layer and overharden the gelatin layer to degrade adhesion to an emulsion or backing layer.

Examples of these dichloro-s-triazine cross-linking agents include the following compounds.

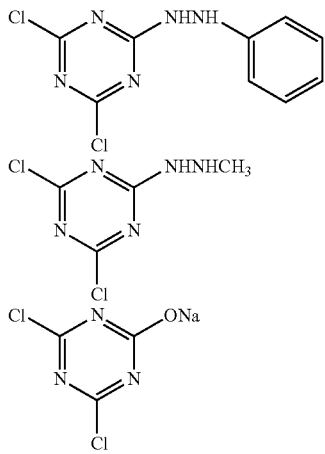

The easily-adhesive layer can further contain an ultraviolet absorbent as well.

From the viewpoint of ensuring high level of ultraviolet absorbing power and excellent performance of liquid crystal display, it is preferable to use ultraviolet absorbents allowing a polarizing plate protective film after their addition to constituent layers of the film to have in its entirety a transmittance of 0 to 50%, preferably 0 to 30%, far preferably 0 to 10%, at a wavelength of 380 nm and a transmittance of 80% to 100%, preferably 85% to 100%, far preferably 90% to 100%, at a wavelength of 600 nm. Specifically, such ultraviolet absorbents are the same ones that can be used in a hard coating layer a described hereinafter. The suitable amount of ultraviolet absorbents used is adjusted to constitute 1 to 20 mass %, preferably 3 to 15 mass %, of the solids content in the easily-adhesive layer.

In addition, the easily-adhesive layer can contain a conductive metal oxide. Specifically, it is preferable that the conductive metal oxide used therein is conductive metal oxide particles usable in an antistatic layer described hereinafter.

The surface resistance of the easily-adhesive layer is preferably from $10^5$ to $10^{12}$ Ω/sq, far preferably from $10^5$ to $10^9$ Ω/sq, especially preferably from $10^5$ to $10^8$ Ω/sq. The surface resistance of an antistatic layer can be determined by a four-probe method.

Alternatively, the easily-adhesive layer can be provided on both sides of the transparent substrate. In other words, the easily-adhesive layer can also be provided on the side opposite to the hard coating layer's side of the transparent substrate.

The hard coating layer is formed for the purpose of making up for weakness in abrasion resistance of the transparent substrate. In a preferable case where an antiglare property is given to the hard coating layer, reflections on a liquid crystal display device can be reduced.

In an optical design for formation of an antireflective film, it is appropriate that the hard coating layer for use in an embodiment of the invention have a refractive index of 1.48 to 2.00, preferably 1.52 to 1.90, far preferably 1.55 to 1.80.

For the purpose of controlling a refractive index of the hard coating layer, a monomer with a high refractive index, inorganic particles, or both can be added to a binder of the hard coating layer. Inorganic particles have an effect of inhibiting curing shrinkage by crossing reaction in addition to refractive index control. In an embodiment of the invention, an integrated whole that is composed of a polymer formed by polymerizing monomers as described below, including a multifunctional monomer and/or a monomer with a high refractive index, after application of a hard coating layer and inorganic particles dispersed in the polymer is referred to as binder.

It is preferable that the hard coating layer is formed from a binder including a resin made by cross-linking reaction or polymerization reaction of an ionizing radiation curable compound. More specifically, the hard coating layer can be formed by applying a coating composition containing an ionizing radiation curable multifunctional monomer or oligomer to the easily-adhesive layer formed on the transparent substrate, and then by subjecting the multifunctional monomer or oligomer to cross-linking reaction or polymerization reaction.

Suitable functional groups of the ionizing radiation curable multifunctional monomer or oligomer are functional groups capable of causing photopolymerization, electron beam polymerization or radiation polymerization. Of these groups, functional groups capable of causing photopolymerization are preferred over the others.

Examples of functional groups capable of causing photo polymerization include unsaturated functional groups capable of causing polymerization, such as a (meth)acryloyl group, a vinyl group, a styryl group and an allyl group. Of these groups, acryloyl and methacryloyl groups are preferred over the others.

From the viewpoint of imparting sufficient durability and impact resistance to the film, the thickness of the hard coating layer is generally of the order of 0.5 µm to 50 µm, preferably from 1 µm to 20 µm, far preferably from 2 µm to 18 µm, especially preferably from 3 µm to 15 µm.

In addition, the strength of the hard coating layer is preferably H or higher, far preferably 2H or higher, especially preferably 3H or higher, as determined by pencil hardness testing.

Furthermore, it is the more advantageous for the hard coating layer to suffer a smaller amount of abrasion when a sample piece thereof is subjected to the Taber test according to JIS K5400.

The suitable haze of the hard coating layer varies depending on the function to be imparted to an intended polarizing plate protective film. When it is intended to retain picture sharpness and to impart any light-scattering function to neither the interior nor the surface of the hard coating layer, the lower the haze value, the better the intention is achieved. To be concrete, the haze value is preferably 10% or below, far preferably 5% or below, especially preferably 2% or below.

On the other hand, when it is intended to impart an anti-glare function through surface scattering of the hard coating layer, the total haze of the present polarizing plate protective film is preferably from 3% to 80%, far preferably from 5% to 70%. In addition, the surface haze of the present polarizing plate protective film is preferably from 0.3% to 70%, far preferably from 0.3% to 20%. And the internal haze (the value calculated by subtraction of the surface haze value from the total haze value) of the present polarizing plate protective film is preferably from 0% to 80%, far preferably from 0% to 70%, especially preferably from 0% to 60%.

Both the surface haze and the internal haze of the present film are optionally adjustable in response to the intended purpose.

For the purpose of retaining definition it is favorable to control the sharpness in transmission imaging in addition to control of a surface roughness profile. It is appropriate that the sharpness in transmission imaging on the polarizing plate protective film having no antiglare function be 60% or more. In general the sharpness in transmission imaging is an indicator pointing to how the images transmitted through the film and projected are blurred. Specifically, the greater value of such sharpness indicates that images viewed via the film are the sharper and the better. The sharpness in transmission imaging is preferably 70% or more, far preferably 80% or more.

<Imparting Antiglare Property>

As methods of creating an antiglare property, there are known the method as disclosed in JP-A-6-16851 wherein antiglare property is created by lamination of an embossed matte film having microscopic asperities on its surface, the method as disclosed in JP-A-2000-206317 wherein an antiglare property is created through curing shrinkage caused in an ionizing radiation curable resin by difference in amount of exposure to ionizing radiation, the method as disclosed in JP-A-2000-338310 wherein the mass ratio of a good solvent to a translucent resin is decreased by drying and asperities are formed on the coating surface by gelling and solidifying translucent fine particles and the translucent resin, the method as disclosed in JP-A-2000-275404 wherein surface roughness is imparted by externally applied pressure, and so on.

In the case of imparting an antiglare property to the hard coating layer, it is preferable that a composition including a binder capable of imparting hard coating properties, light-transmitting particles for imparting an antiglare property and a solvent is used and surface roughness is formed with asperities of individual light-transmitting particles themselves or aggregates in which those particles gather.

The hard coating layer having an antiglare function which is formed with dispersion of matte particles includes a binder and light-transmitting particles dispersed in the binder. It is preferable that the antiglare layer having an antiglare property offers a compromise between the antiglare property and a hard coating property.

The present polarizing plate protective from may have either the hard coating layer having an antiglare property or the hard coating layer having no antiglare property, or both. Hereinafter, the hard coating layer having an antiglare property is referred to as "antiglare layer" in some cases.

<Binder>

The antiglare layer can be formed by cross-linking reaction or polymerization reaction of an ionizing radiation curable compound. More specifically, the binder in the antiglare layer can be formed by applying a coating composition containing an ionizing radiation curable multifunctional monomer or oligomer to the transparent substrate, and then by subjecting the multifunctional monomer or oligomer to cross-linking reaction or polymerization reaction.

Suitable functional groups of the ionizing radiation curable multifunctional monomer or oligomer are functional groups capable of causing photopolymerization, electron beam polymerization or radiation polymerization. Of these groups, functional groups capable of causing photopolymerization are preferred over the others.

Examples of functional groups capable of causing photo polymerization include unsaturated functional groups capable of causing polymerization, such as a (meth)acryloyl group, a vinyl group, a styryl group and an allyl group. Of these groups, acryloyl and methacryloyl groups are preferred over the others.

Examples of a photopolymerizable multifunctional monomer having functional groups capable of causing photopolymerization include neopentyl glycol acrylate, 1,6-hexanediol (meth)acrylate, (meth)acrylic acid diesters of alkylene glycols such as propylene glycol di(meth)acrylate, (meth)acrylic acid diesters of polyoxyalkylene glycols such as triethylene glycol di(meth)acrylate, dipropylene glycol di(meth)acrylate, polyethylene glycol di(meth)acrylate and polypropylene glycol di(meth)acrylate, (meth)acrylic acid diesters of polyhydric alcohol compounds such as pentaerythritol di(meth) acrylate, and (meth)acrylic acid diesters of ethylene oxide or propylene oxide adducts such as 2,2-bis{4-(acryloxy diethoxy)phenyl}propane and 2,2-bis{4-(acryloxy polypropoxy)phenyl}propane.

In addition, epoxy(meth)acrylates, urethane (meth)acrylates and polyester (meth)acrylates are also used to advantage as photopolymerizable multifunctional monomers.

Of those monomers, esters formed from polyhydric alcohol compounds and (meth)acrylic acid are preferred over the others. The preferred by far are multifunctional monomers having at least three (meth)acryloyl groups per molecule, with examples including trimethylolpropane tri(meth)acrylate, trimethylolethane tri(meth)acrylate, 1,2,4-cyclohexanetetra(meth)acrylate, pentaglycerol triacrylate, pentaerythritol tetra(meth)acrylate, pentaerythritol tri(meth)acrylate, (di) pentaerythritol triacrylate, (di)pentaerythritol pentacrylate, (di)pentaerythritol tetra(meth)acrylate, (di)pentaerythritol hexa(meth)acrylate, tripentaerythritol triacrylate and tripentaerythritol hexatriacrylate.

The terms "(meth)acrylate", "(meth)acrylic acid" and "(meth)acryloyl" used in the invention represent "acrylate or methacrylate", "acrylic acid or methacrylic acid" and "acryloyl or methacryloyl", respectively.

In order to control the refractive index, monomers different in refractive index can be used as binder monomers. Examples of a monomer having a high refractive index in particular include bis(4-methacryloylthiophenyl) sulfide, vinylnaphthalene, vinylphenyl sulfide and 4-methacryloxyphenyl-4'-methoxyphenylthioether.

In addition, the dendrimers disclosed, e.g., in JP-A-2005-76005 and JP-A-2005-36105, and the norbornene ring containing monomers disclosed, e.g., in JP-A-2005-60425 can also be used.

As to the multifunctional monomer, two or more kinds of multifunctional monomers can be used in combination.

The polymerization of those monomers having ethylenically unsaturated groups can be performed by irradiation with ionizing radiation or heating in the presence of a radical photoinitiator or a radical thermoinitiator.

In the polymerization reaction of photopolymerizable multifunctional monomers, it is appropriate to use photopolymerization initiators. As the photopolymerization initiators, radical photopolymerization initiators and cationic photopolymerization initiators, especially radical photopolymerization initiators, are preferred.

<Photoinitiator>

Examples of a radical photopolymerization initiator include acetophenones, benzoins, benzophenones, phosphine oxides, ketals, anthraquinones, thioxanthones, azo compounds, peroxides (JP-A-2001-139663 and so on), 2,3-dilkyldione compounds, disulfide compounds, fluoroamine compounds, aromatic sulfonium compounds, lophine dimers, onium salts, borate salts, active esters, active halogen compounds, inorganic complexes and coumarins.

Examples of acetophenones include 2,2-dimethoxyacetophenone, 2,2-diethoxyacetophenone, p-dimethylacetophenone, 1-hydroxy-dimethylphenyl ketone, 1-hydroxy-dimethyl-p-isopropylphenyl ketone, 1-hydroxycyclohexyl phenyl ketone, 2-methyl-4-methylthio-2-morpholinopropiophenone, 2-benzyl-2-dimethylamino-1-(4-morpholinophenyl)-butanone, 4-phenoxydichloroacetophenone and 4-t-butyl-dichloroacetophenone.

Examples of benzoins include benzoin, benzoin methyl ether, benzoin ethyl ether, benzoin isopropyl ether, benzyl dimethylketal, benzenesulfonic acid ester of benzoin, and toluenesulfonic acid ester of benzoin.

Examples of benzophenones include benzophenone, hydroxybenzophenone, 4-benzoyl-4'-methyldiphenyl sulfide, 2,4-dichlorobenzophenone, 4,4-dichlorobenzophenone, p-chlorobenzophenone, 4,4'-dimethylaminobenzophenone (Michler's ketone), and 3,3',4,4'-tetra(t-butylperoxycarbonyl)benzophenone.

Examples of borate salts include the organic borate salt compounds described, e.g., in Japanese Patent No. 2764769, JP-A-2002-116539, and Kunz, Martin, *Rad. Tech '98 Proceeding April*, pp. 19-22, Chicago (1998). More specifically, the compounds disclosed in paragraphs [0022] to [0027] of JP-2002-116539 cited above are given as the examples. Examples of other organic boron compounds include the organic boron-transition metal coordinated complexes as disclosed in JP-A-6-348011, JP-A-7-128785, JP-A-7-140589, JP-A-7-306527 and JP-A-7-292014. Specifically, ion complexes of cationic dyes are included therein.

Examples of phosphine oxides include 2,4,6-trimethylbenzoyldiphenylphosphine oxide.

Examples of active esters include IRGAQCURE OXE01 (1-[4-(phenylthio)]-2-(O-benzoyloxime)octane-1,2-dione, a product of Ciba Specialty Chemicals), sulfonic acid esters and active cyclic esters.

Specifically, the compounds 1 to 21 disclosed in Examples of JP-A-2000-80068 are especially preferred.

Examples of onium salts include aromatic diazonium salts, aromatic iodonium salts and aromatic sulfonium salts.

Examples of active halogen compounds include the compounds described, e.g., in Wakabayashi et al., *Bull Chem. Soc. Japan*, vol. 42, p. 2924 (1969), U.S. Pat. No. 3,905,815, JP-A-5-27830, and M. P. Hutt, *Journal of Heterocyclic Chemistry*, vol. 1 (No. 3) (1970), notably oxazole compounds and s-triazine compounds which are substituted by trihalomethyl groups. The preferred among them are s-triazine derivatives having the structure that dihalomethyl or trihalomethyl groups are attached to their respective s-triazine rings. Specifically, s-triazine and oxadiazole compounds are known, with examples including 2-p-methoxyphenyl)-4,6-bis(trichloromethyl)-s-triazine, 2-(p-styrylphenyl)-4,6-bis(trichloromethyl)-s-triazine, 2-(3-bromo-4-di(ethylacetate)aminophenyl)-4,6-bis(trichloromethyl)-s-triazine, and 2-trihalomethyl-5-(p-methoxyphenyl)-1,3,4-oxadiazole. More specifically, the compounds disclosed in JP-A-58-15503, pp. 14-30; JP-A-55-77742, pp. 6-10; JP-B-60-27673, p. 287, No. 1 to No. 8; JP-A-60-239736, pp. 443-444, No. 1 to No. 17; and U.S. Pat. No. 4,701,399, No. 1 to No. 19 are especially preferable.

Examples of inorganic complexes include bis($\eta^5$-2,4-cyclopentadiene-1-yl)-bis(2,6-difluoro-3-(1H-pyrrole-1-yl)phenyl)titanium.

Examples of coumarins include 3-ketocoumarin.

Those initiators may be used atone or as mixtures of two or more thereof. Various examples thereof are also described in *Saishin UV Koka Gijutsu*, p. 159, K. K. Gijutu Joho Kyokai (1991), and Kiyoshi Kato, pp. 65-I48, Sogo Gijutsu Center (1989), and they are useful in the invention, too.

Suitable examples of commercially available radical photopolymerization initiators include KAYACURE (DETX-S, BP-100, BDMK, CTX, BMS, 2-EAQ, ABQ, CPTX, EPD, ITX, QTX, BTC, MCA and so on, products of Nippon Kayaku Co., Ltd.), IRGACURE (651, 184, 500, 819, 907, 369, 1173, 1870, 2959, 4265, 4263 and so on, products of Ciba Specialty Chemicals), Esacure (KIP100F, KB1, EB3, BP, X33, KT046, KT37, KIPI150 and TZT, products of Sartomer Company Inc.), and combinations of two or more of these products.

It is appropriate that those photopolymerization initiators be used in an amount of 0.1 to 15 parts by mass, preferably 1 to 10 parts by mass, per 100 parts by mass of multifunctional monomer(s).

<Photosensitizer>

In addition to photopolymerization initiators, photosensitizers may be used. Examples of photosensitizers include n-butylamine, triethylamine, tri-n-butyl phosphine, Michler's ketone and thioxanthone.

Furthermore, such photosensitizers each may be used in combination with at least one kind of assistant, such as an azido compound, a thiourea compound or a mercapto compound.

Examples of a commercially available photosensitizer include KAYACURE (EMBI, EPA), produced by Nippon Kayaku Co., Ltd.

<Thermoinitiator>

As radical thermoinitiators, an organic or inorganic peroxide, organic azo and diazo compounds, and the like can be used.

Examples of such an organic peroxide include benzoyl peroxide, halogenobenzoyl peroxide, lauroyl peroxide, acetyl peroxide, dibutyl peroxide, cumene hydroperoxide and butyl hydroperoxide, examples of such an inorganic peroxide include hydrogen peroxide, ammonium persulfate and potassium persulfate, examples of such an azo compound include 2,2'-azobis(isobutyronitrile), 2,2'-azobis(propionitrile) and 1,1'-azobis(cyclohexanecarbonitrile), and examples of such a diazo compound include diazoaminobenzene and p-nitrobenzene diazonium.

<Light-Transmitting Particles>

Although the light-transmitting particles may be either organic particles or inorganic particles, plastic beads, especially those having high transparency and a refractive index different from the binder's refractive index by 0.01 to 0.3, suit them very well.

Examples of organic particles usable as light-transmitting particles include polymethyl methacrylate particles (refractive index: 1.49), cross-linked poly(acryl-styrene) copolymer particles (refractive index: 1.54), melamine resin particles (refractive index: 1.57), polycarbonate particles (refractive index: 1.57), polystyrene particles (refractive index: 1.60), cross-linked polystyrene particles (refractive index: 1.61), polyvinyl chloride particles (refractive index: 1.60) and benzoguanamine-melamine formaldehyde particles (refractive index: 1.68).

Examples of inorganic particles include silica particles (refractive index: 1.44), alumina particles (refractive index: 1.63), zirconia particles, titania particles, and inorganic particles having hollows or pores.

Of those particles, cross-linked polystyrene particles, cross-linked poly((meth)acrylate) particles and cross-linked poly(acryl-styrene) copolymer particles are used to advantage over the others. By controlling the binder's refractive index to suit the refractive index of light-transmitting particles chosen from those examples, the internal haze, the surface haze and the center-line average roughness which are each specified in the invention can be achieved.

The suitable refractive indexes of the binder (translucent resin) and the light-transmitting particles for use in the invention are each within the range of 1.45 to 1.70, preferably 1.48 to 1.65. The adjustment of the refractive index to such ranges can be made by appropriately selecting kinds of a binder and light-transmitting particles to be used and a ratio between their amounts to be used. What selections should be made can be experimentally found in advance with case.

Herein, the binder's refractive index can be quantitatively evaluated by direct measurement with an Abbe refractometer, or through spectral reflection spectrum or spectroscopic ellipsometry measurement. The light-transmitting particle's refractive index can be determined by preparing dispersions which are the same in amount of light-transmitting particles dispersed and various in refractive index by use of solvent mixtures containing two kinds of solvents different in refractive index at various mixing ratios as their respective dispersion media, measuring turbidities of the dispersions, and then measuring the refractive index of the solvent mixture showing the minimum turbidity with an Abbe refractometer.

The light-transmitting particles as recited above are prone to form a precipitate in a hinder, so an inorganic filler such as silica may be added for the purpose of avoiding precipitation. The greater the inorganic filler added is in amount, the more effective it becomes in avoiding the precipitation of light-transmitting particles, but the more adversely it affects transparency of a coating applied. Therefore, it is appropriate that an inorganic filler having a particle size of 0.5 µm or below be added to a hinder in such an amount as not to impair the transparency of a coating applied, specifically in a proportion of the order of less than 0.1 mass %.

The average size of light-transmitting particles is preferably from 0.5 to 10 µm, far preferably from 2.0 to 8.0 µm. The average particle size in the 0.5 to 10 µm range is preferable because it neither becomes a cause of blurry letters on a display nor results in troubles such as curling and an increase in cost.

Additionally, two or more kinds of light-transmitting particles different in particle size may be used in combination. This is because the light-transmitting particles having greater sizes can impart antiglare properties, while the light-transmitting particles having smaller sizes can reduce a rough feel of the coating surface.

The tight-transmitting particles are mixed so as to constitute 3 to 30 mass %, preferably 5 to 20 mass %, of total solids content in the layer they are mixed into. When the transparent particles are mixed in a proportion of less than 3 mass %, the effect produced thereby is insufficient; while, when the proportion is increased beyond 30 mass %, they cause troubles of blurring images, rendering the coating surface opaque and whitish or making the coating surface glisten, and so on.

Furthermore, the density of light-transmitting particles is preferably from 10 to 1,000 mg/m², far preferably from 100 to 700 mg/m².

<Preparation of Light-Transmitting Particles and Classification Method>

The light-transmitting particles may be produced by any of polymerization methods, such as a suspension polymerization method, an emulsion polymerization method, a soap-free emulsion polymerization method, a dispersion polymerization method and a seed polymerization method. These production methods can be carried out by reference to the methods described in Takayuki Otsu & Masayoshi Kinoshita, *Kobunshi Gosei no Jikkenho*, pages 130, 147 and 148, Kagaku-dojin Publishing Company Inc.; the methods described in *Gosei Kobunshi*, vol. 1, pp. 246-290, and vol. 3, pp. 1-108; and the methods as disclosed in Japanese Patent Nos. 2543503, 3508304, 2746275, 3521560 and 3580320, JP-A-10-1561, JP-A-7-2908, JP-A-5-297506 and JP-A-2002-145919.

With respect to the particle size distribution the light-transmitting particles are preferably a monodisperse system from the viewpoint of controlling the haze value and dispersibility and ensuring uniformity in coating surface condition. When particles having sizes at least 20% greater than the average size are defined as coarse particles, it is appropriate that such coarse particles constitute at most 1%, preferably at most 0.1%, far preferably at most 0.1%, of all the particles by number. An example of a strong measure to prepare particles having such a size distribution is classification after production or synthesis reaction, and particles having the desired size distribution can be obtained by increasing the number of times the classification is carried out or the severity of the classification.

For the classification, it is favorable to adopt a wind classification method, a centrifugal classification method, a precipitation classification method, a filtration classification method, an electrostatic classification method or the like.

In addition, matte particles of two or more types different in size may be used together. It is possible to impart antiglare property by use of matte particles having greater sizes and another optical property by use of matte particles having smaller sizes. For instance, when an antiglare antireflective film is stuck on a high-definition display having a pixel count of 133 ppi or more, a problem in point of display image quality, which is referred to as "glitter", occurs in some cases. The glitter is brought about by loss of uniformity in brightness, which results from expansion or reduction of picture elements by microscopic asperities present on the antiglare antireflective film surface, so it can be greatly improved by using matte particles which are smaller in size than matte particles used for imparting antiglare property and different in refractive index from the binder.

An example of a method of malting an antiglare layer, other than the method of developing an antiglare property by use of light-transmitting particles is a method of making an antiglare layer by utilizing spinodal decomposition of two or more polymers.

The antiglare layer made by spinodal decomposition is composed of two or more polymers different in refractive index from one another, and generally forms a phase separation structure having at least co-continuous phase structure in the atmosphere used (especially under room temperature of the order of about 10° C. to 30° C.). And the co-continuous phase structure is formed by spinodal decomposition from a liquid phase containing two or more polymers (a liquid phase at ordinary temperatures, such as a mixed liquid or a solution). More specifically, the co-continuous phase structure generally contains two or more polymers, and is formed by using a composition forming a liquid phase (e.g., a mixed liquid or a solution) at ordinary temperatures and undergoing the spinodal decomposition via evaporation of the solvent. Such an antiglare layer is formed from a liquid phase, so it has a uniform and fine co-continuous phase structure. When the transmission antiglare layer thus formed is used, incident light is scattered isotropically in a substantial sense, and besides, directivity can be imparted to transmission scattered light. Therefore, high light-scattering power and high directivity are compatible with each other.

Enhancement of light-scattering power can be performed by using a plurality of polymers as a combination allowing a refractive-index differential of the order of, say, 0.01 to 0.2, preferably of the order of 0.1 to 0.15. When the refractive-index differential is 0.01 or more, the transmission scattered light shows no drop in intensity; while, when the refractive-index differential is 0.2 or below, high directivity can be imparted to the transmission scatted light.

In a group of polymers from which two or more polymers can be appropriately selected in combination are included a styrene resin, a (meth)acrylic resin, a vinyl ester resin, a vinyl ether resin a halogen-containing resin, an olefin resin (including an alicyclic olefin resin), a polycarbonate resin, a polyester resin, a polyamide resin, a thermoplastic resin, a polysulfone resin (such as polyether sulfone or polysulfone), a polyphenylene ether resin (such as a 2,6-xylenol polymer), a cellulose derivative (such as cellulose ester, cellulose carbamate or cellulose ether), a silicone resin (such as polydimethylsiloxane or polymethylphenylsiloxane), and rubber or an elastomer (including rubber of diene type such as polybutadiene or polyisoprene, a styrene-butadiene copolymer, an acrylonitrile-butadiene copolymer, acrylic rubber, urethane rubber, and silicone rubber).

Examples of polymers preferably selected include a styrene resin, a (meth)acrylic resin, a vinyl ester resin, a vinyl ether resin, a halogen-containing resin, an alicyclic olefin resin, a polycarbonate resin, a polyester resin, a polyamide resin, a cellulose derivative, a silicone resin, and rubber or an elastomer. As two or more polymers for combined use, resins which are generally in a non-crystalline state and soluble in an organic solvent (especially a common solvent in which two or more polymers can dissolve) are selected. And it is particularly advantageous to select resins high in moldability or film formability, transparency and weather resistance, such as a styrene resin, a (meth)acrylic resin, an alicyclic olefin resin, a polyester resin and a cellulose derivative (such as cellulose ester).

These polymers can be used in appropriate combinations of two or more thereof. In one example of the combination of two or more polymers, a cellulose derivative, notably a cellulose ester (chosen from cellulose $C_{2-4}$ alkylcarboxylates, such as cellulose diacetate, cellulose triacetate, cellulose acetate propionate and cellulose acetate butyrate), is at least one constituent polymer and may be combined with other polymers.

The glass transition temperatures of polymers can be chosen from the range of, say, $-100°$ C. to $250°$ C., preferably from the range of $-50°$ C. to $230°$ C., far preferably from the range on the order of $0°$ C. to $200°$ C. (e.g., on the order of $50°$ C. to $180°$ C.). Additionally, in point of sheet strength and stiffness, it is advantageous for at least one constituent polymer to have a glass transition temperature of $50°$ C. or more (e.g., on the order of $70°$ C. to $200°$ C.), preferably $100°$ C. or more (e.g., on the order of $100°$ C. to $170°$ C.). The weight-average molecular weight of polymers can be chosen from the range of, say, 1,000,000 or below (e.g., the range on the order of 10,000 to 1,000,000), preferably the range on the order of 10,000 to 700,000.

The wet method of vaporizing a solvent from a liquid phase containing two or more polymers and performing spinodal decomposition, which is adopted in the invention, enables formation of an antiglare layer having a substantially isotropic co-continuous phase structure, irrespective of compatibility among the polymers in principle. Therefore, though the two or more polymers may be a combination of polymers compatible with one another, polymers incompatible with one another (or polymers causing phase separation) are combined in many cases since phase separation structures can be generally controlled with ease by spinodal decomposition and co-continuous phase structures are formed with efficiency.

The two or more polymers may be constituted of a combination of first and second polymers. Each of the first polymer and the second polymer may be constituted of either one or more than one resin. There is no particular restriction on how the first polymer and the second polymer are combined. When the first polymer is, e.g., a cellulose derivative (such as a cellulose ester including cellulose acetate propionate), the second polymer may include a styrene resin (such as polystyrene or a styrene-acrylonitrile copolymer), a (meth)acrylic resin (such as polymethyl methacrylate), an alicyclic olefin resin (such as a polymer of norbornene), a polycarbonate resin or/and a polyester resin (such as a $C_{2-4}$ alkylene acrylate copolyester).

The ratio of the first polymer to the second polymer is on the order of, say, the former/the latter=10/90 to 90/10 by mass, preferably 20/80 to 80/20 by mass, far preferably 30/70 to 70/30 by mass, particularly preferably 40/60 to 60/40 by mass. When the proportion of either one of the polymers is too high, the volume ratio between separated phases is biased, so the intensity of scattered light is lowered. Additionally, when a sheet is formed with three or more polymers, the content of each polymer can be chosen generally from the range on the order of 1 to 90 mass % (say, 1 to 70 mass %, preferably 5 to 70 mass %, far preferably 10 to 70 mass %).

The antiglare layer has at least a co-continuous phase structure. The co-continuous phase structure, though there are cases where it is referred to as a co-continuous structure or a three-dimensionally continued or linked structure, means a structure that at least two kinds of constituent polymer phases are in a continuous state (e.g., a reticulate structure). It is essential only that the antiglare layer have at least a co-continuous phase structure, so the antiglare layer may have a structure that a co-continuous phase structure and a liquid-drop phase structure (an independent or isolated phase structure) intermingle with each other. In spinodal decomposition, the co-continuous phase structure is formed as flue phase separation progresses, and further progress of phase separation brings about discontinuity in the continuous phase owing to surface tension of the continuous phase in itself, resulting in formation of a liquid-drop phase structure (an islands-in-sea structure having sphere- or perfect sphere-shaped independent phases). Therefore, it is also possible to form intermediate structures between the co-continuous phase structure and the liquid-drop phase structure, namely phase structures in the process of transition from the co-continuous phase to the liquid-drop phase, according to the degree in phase separation. In the invention, such intermediate structures are also referred to as co-continuous phase structures. When the phase separation structure is a structure in which the co-continuous phase structure and the liquid-drop structure intermingle with each other, the proportion of the liquid-drop phase (independent polymer phase) may be, say, 30% or below (by volume), preferably 10% or below (by volume). The co-continuous phase structure has no particular restriction on its shape, but it may be shaped like a network, notably a random network.

The co-continuous phase structure is generally reduced in in-plane anisotropy of a layer or sheet, and it is isotropic in a substantial sense. The word "isotropic," as used herein means that the average distance between phases in the co-continuous phase structure is substantially the same in all in-plane directions of sheet.

In the co-continuous phase structure, the interphase distance (distance between identical phases) generally has regularity. Therefore, transmission scattering of light incident on the sheet is oriented in particular directions by Bragg reflection. Accordingly, even when the sheet is placed on a reflection liquid-crystal display device, transmission scatted light can be oriented in limited directions and a display screen can be made highly bright. Thus, the problem that previous transmission antiglare layers of particle dispersion type failed to solve, namely reflection of a light source (e.g., a fluorescent lamp) in a panel, can be avoided.

The average interphase distance of the co-continuous phase in the antiglare layer is, say, on the order of 0.5 to 20 μm (e.g., 1 to 20 µm), preferably on the order of 1 to 15 µm (e.g., 1 to 10 µm). When the average interphase distance is too small, high intensity of scattered light is difficult to obtain; while, when the average interphase distance is too great, directivity of transmission scattered light is reduced.

The average interphase distance in the co-continuous layer can be worked out by observations of photomicrographs (taken via a transmission microscope, a phase-contrast microscope or a confocal laser scanning microscope) of the antiglare layer. Alternatively, the average interphase distance d may be calculated by measuring a scatter angle θ at the maximum of scattered light intensity in accordance with the same method as adopted for evaluating the directivity of scattered light, which is described hereinafter, and using the following expression of Bragg reflection condition;

$$2d \cdot \sin(\theta/2) = \lambda$$

wherein d represents an average interphase distance in a co-continuous phase, θ represents a scatter angle, and λ represents the wavelength of light.

As an example of a method for formation of an antiglare layer, other than the method of causing antiglare property to develop by use of light-transmitting particles, mention may be made of a method of forming an antiglare layer with an embossing process.

The antiglare layer formed with an embossing process is a light diffusing layer which is formed on a transparent substrate and constituted essentially of an ionizing radiation cure- or thermosetting-type resinous composition embossed with a matte embossing film having microscopic asperities on the surface.

When the resin is made from an ionizing radiation cure-type resinous composition, the antiglare layer is preferably formed with a process including the following steps of:

applying a coating of ionizing radiation cure-type resinous composition to a transparent substrate, laminating the coating of ionizing radiation cure-type resinous composition in an uncured state with a matte embossing film having microscopic asperities on the surface, irradiating the embossing film-laminated coating with ionizing radiation to cure the coating of ionizing radiation cure-type resinous composition, and peeling the embossing film away from the thus cured coating of ionizing radiation cure-type resinous composition.

On the other hand, in the case of making the resin from a thermosetting-type resinous composition, the antiglare layer is preferably formed with a process including the following steps of:

applying a coating of thermosetting-type resinous composition to a transparent substrate, laminating the coating of thermosetting-type resinous composition in an unset state with a matte embossing film having microscopic, asperities on the surface, heating the embossing film-laminated coating to set the coating of thermosetting-type resinous composition, and peeling the embossing film away from the thus set coating of thermosetting-type resinous composition.

The lamination of an embossing film on the coating of ionizing radiation cure-type resinous composition in an uncured state is carried out after solvent drying when the resinous composition coated is a composition diluted with a solvent, while the lamination of an embossing film is carried out on the coating as it is when the resinous composition coated is a solvent-free composition.

The film forming component in an ionizing radiation cure-type resinous composition used suitably for making a light-diffusing layer with an embossing process contains a substance having acrylate-type functional groups, such as a relatively low molecular-weight polyester, polyether, acrylic, epoxy, urethane, alkyd, spiro-acetal, polybutadiene or polythiolpolyene resin having acrylate-type functional groups, or an oligomer or prepolymer of (meth)acrylate of a multifunctional compound like polyhydric alcohol, and a relatively large amount of reactive diluent including a monofunctional monomer, such as ethyl (meth)acrylate, ethylhexyl (meth) acrylate, styrene, methylstyrene or N-vinylpyrrolidone, and a multifunctional monomer, such as trimethylolpropane tri (meth)acrylate, hexanediol (meth)acrylate, tripropylene glycol di(meth)acrylate, diethylene glycol di(meth)acrylate, pentaerythritol tri(meth)acrylate, dipentaerythritol hexa(meth)acrylate, 1,6-hexanediol di(meth)acrylate and neopentyl glycol di(meth)acrylate.

As the aforesaid film foaming component, a mixture of polyester acrylate and polyurethane acrylate can be used to particular advantage. This is because, although polyester acrylate is able to form a very hard film and suitable for formation of a hard coating, the coating formed with polyester acrylate by itself is poor in impact resistance and becomes brittle, so polyurethane acrylate is used in combination with polyester acrylate for the purpose of imparting impact resistance and elasticity to the coating. The proportion of polyurethane acrylate mixed is adjusted to 30 parts by mass or below per 100 parts by mass of polyester acrylate. This is because, when the proportion is increased beyond such an upper limit, the coating formed becomes too soft and loses hardness.

The ionizing radiation cure-type resinous composition can be used as a UV cure resinous composition when mixed with a photopolymerization initiator, such as acetophenones, benzophenones, Michler's benzoyl benzoate, α-amyloxime ester, tetramethylthiuram monosulfide or thioxanthones, and a photosensitizer, such as n-butylamine, triethylamine or tri-n-butylphosphine. In the invention, it is especially preferable to mix urethane acrylate as the oligomer and dipentaerythritol hexa(meth)acrylate as the monomer.

In the coating composition for forming a coating having both a light diffusion property and a property as a hard coating (abrasion resistance), a solvent drying-type resin may be mixed in an amount of 10 to 100 parts by mass per 100 parts by mass of the ionizing radiation cure-type resin. As the solvent drying-type resin, a thermoplastic resin is mainly used. The kind of a solvent drying-type thermoplastic resin added to an ionizing radiation cure-type resin may be usual one. However, in the special case of using as the ionizing radiation cure-type resin a mixture of polyester acrylate and polyurethane acrylate, the use of polymethacrylic acid methylacrylate or polymethacrylic acid butylacrylate as the solvent drying-type thermoplastic resin enables a resultant coating to retain high hardness in this case, since the refractive index of the solvent drying-type thermoplastic resin as specified above approximates to that of the main ionizing radiation cure-type resin, the transparency of the resultant coating is not impaired, so such a combined use has advantages in transparency, notably low haze and high transmittance) and compatibility.

When a cellulose resin, especially triacetyl cellulose, is used as the transparent substrate, it is advantageous in point of adhesiveness and transparency of a resultant coating that the solvent drying-type resin mixed into the ionizing radiation cure-type resin is a cellulose resin, such as nitrocellulose, acetyl cellulose, cellulose acetate propionate or ethylhydroxyethyl cellulose.

The thickness of the antiglare layer is preferably from 1 to 25 µm, far preferably from 2 to 15 µm. Since too thin an antiglare layer is lacking in hardness and too thick an antiglare layer exacerbates curling and brittleness and causes reduction in working suitability in some cases, it is preferable to adjust the thickness to the foregoing range.

The center-line-average roughness (Ra) of the antiglare layer is preferably from 0.01 to 0.40 μm, far preferably from 0.05 to 0.20 μm. When the Ra value exceeds 0.40 μm, there occur troubles, such as screen glare and whitening of screen surface by reflections of outside light. In addition, it is preferable to adjust the definition in transfer imaging to a range of 5 to 60%.

The strength of the antiglare layer is preferably 3H or higher, far preferably 4H or higher, especially preferably 5H or higher, as determined by pencil hardness testing.

<Ultraviolet Absorbent>

An ultraviolet absorbent can be added to the hard coating layer. Since polarizers degrade readily in ultraviolet radiation, it is advantageous for two protective film to have ultraviolet absorption power.

From the viewpoint of delivering high ultraviolet absorption power and contributing to satisfactory liquid-crystal display performance, it is preferable to use ultraviolet absorbents which can ensure a transmittance of 0 to 50%, preferably 0 to 30%, far preferably 0 to 10%, at a wavelength of 380 nm and a transmittance of 80% to 100%, preferably 85% to 100%, far preferably 90% to 100%, at a wavelength of 600 nm in the overall polarizing plate protective film after the ultraviolet absorbents are added to the film's constituent layers.

As the ultraviolet absorbents, heretofore known ones can be used. Specifically, they include ultraviolet absorbents of benzotriazole type, those of benzophenone type, those of phenyl salicylate type and those of triazine type.

Examples of a benzotriazole-type ultraviolet absorbent include 2-(5-methyl-2-hydroxyphenyl)benzotriazole, 2-(2H-benzotriazole-2-yl)-p-cresol, 2-(2H-benzotriazole-2-yl)-4,6-di-tert-pentylphenol and 2-(2'-hydroxy-5'-methacryloxyethylphenyl)-2H-benzotriazole.

Examples of a benzophenone-type ultraviolet absorbent include 2-hydroxy-4-octoxybenzophenone, 2,4-dihydroxybenzophenone, 2-hydroxy-4-methoxy-4'-chlorobenzophenone, 2,2-dihydroxy-4-methoxybenzophenone and 2,2-dihydroxy-4,4'-dimethoxybenzophenone.

Examples of a phenyl salicylate-type ultraviolet absorbent include p-t-butylphenyl salicylate.

Examples of a triazine-type ultraviolet absorbent include 2,4-diphenyl-6-(2-hydroxy-4-methoxyphenyl)-1,3,5-triazine, 2,4-diphenyl-6-(2-hydroxy ethoxyphenyl)-1,3,5-triazine, 2,4-diphenyl-6-(2-hydroxy-4-propoxyphenyl)-1,3,5-triazine, 2,4-diphenyl-6-(2-hydroxy-4-butoxyphenyl)-1,3,5-triazine, 2,4-diphenyl-6-(2-hydroxy-4-hexyloxyphenyl)-1,3,5-triazine, 2,4-diphenyl-6-(2-hydroxy-4-octyloxyphenyl)-1,3,5-triazine, 2,4-diphenyl-6-(2-hydroxy-4-dodecyloxyphenyl)-1,3,5-triazine, 2,4-diphenyl-6-(2-hydroxy-4-benzyloxyphenyl)-1,3,5-triazine and 2,4-diphenyl-6-(2-hydroxy-4-butoxyethoxyphenyl)-1,3,5-triazine.

Of these ultraviolet absorbents, it is advantageous to use the compounds having functional groups capable of polymerizing with polymerizable monomers in the hard coating layer in terms of an increase in hardness of the hard coating layer, control of bleeding and enhancement of durability.

As to the compounds having such polymerizable functional groups, there are 2-hydroxybenzophenone derivatives and 2-hydroxyphenylbenzotriazole derivatives.

Examples of 2-hydroxybenzophenone derivatives include 2-hydroxy-4-acryloylbenzophenone, 2-hydroxy-4-methacryloyloxybenzophenone, 2-hydroxy-4-(2-acryloyloxy)ethoxybenzophenone, 2-hydroxy-4-(2-methacryloyloxy)ethoxybenzophenone and 2-hydroxy-4-(2-methyl-2-acryloyloxy)ethoxybenzophenone.

Examples of 2-hydroxyphenylbenzotriazole derivatives include 2-[2'-hydroxy-5'-(methacryloyloxy)ethylphenyl]-2H-benzotriazole, 2-[2'-hydroxy-5'-(methacryloyloxy)phenyl]benzotriazole, 2-[2'-hydroxy-5'-(acryloyloxy)phenyl]benzothiazole, 2-[2'-hydroxy-3'-t-butyl-5'-(methacryloyloxy)phenyl]benzotriazole, 2-[2'-hydroxy-3'-methyl-5'-(acryloyloxy)phenyl]benzotriazole, 2-[2'-hydroxy-5'-(methacryloyloxypropyl)phenyl]-5-chlorobenzotriazole, 2-[2'-hydroxy-5'-(methacryloyloxyethyl)phenyl]benzotriazole, 2-[2'-hydroxy-5'-(acryloyloxyethyl)phenyl]benzotriazole, 2-[2'-hydroxy-3'-t-butyl-5'-(methacryloyloxyethyl)phenyl]benzotriazole, 2-[2'-hydroxy-3'-methyl-5'-(acryloyloxyethyl)phenyl]benzotriazole, 2-[2'-hydroxy-5'-(methacryloyloxypropyl)phenyl]-5-chlorobenzotriazole, 2-[2'-hydroxy-5'-(acryloyloxybutyl)phenyl]-5-methylbenzotriazole and [2-hydroxy-3-t-butyl-5-(acryloyloxyethoxycarbonylethyl)phenyl]benzotriazole.

These ultraviolet absorbents with polymerizable functional groups can also be used as mixtures of two or more thereof. Moreover, the combined use of ultraviolet absorbents with and without a polymerizable functional group has an advantage of allowing prevention of ultraviolet-absorbent bleed and increase of ultraviolet-absorbent content in the hard coating layer.

Since the transmittance of a light beam in the wavelength range of 200 to 340 nm follows generally known Beer-Lambert law, the addition amount of ultraviolet absorbents and the thickness of the hard coating layer required for attaining the target figures of light transmittances as specified above can be determined by calculation.

When the hard coating layer is a layer of ultraviolet cure-type resin, it is appropriate that the layer have the highest possible transmittances at wavelengths longer than 340 nm for the purpose of enhancing ultraviolet absorption by ultraviolet-responsive radical polymerization initiators. This purpose can be achieved by selecting ultraviolet absorbents having their absorption peaks at wavelengths below 340 nm. For instance, it is therefore preferable to use 2-(2'-hydroxy-5'-methacryloxyethylphenyl)-2H-benzotriazole or 2-(2H-benzotriazole-2-yl)-p-cresol as a benzotriazole-type ultraviolet absorbent, or as a triazine-type ultraviolet absorbent 2,4-diphenyl-6-(2-hydroxy-4-dodecyloxyphenyl)-1,3,5-triazine, 2,4-diphenyl-6-(2-hydroxy-4-benzyloxyphenyl)-1,3,5-triazine or 2,4-diphenyl-6-(2-hydroxy-butoxyethoxyphenyl)-1,3,5-triazine.

<Undercoating Layer>

In the invention, an undercoating layer containing a hydrophilic high polymer can further be provided on the easily-adhesive layer as mentioned above. Of the two easily-adhesive layers facing each other across the transparent substrate, the undercoating layer is preferably provided on the easily-adhesive layer opposite to the hard coating layer's-side easily-adhesive layer. By providing the undercoating layer in such a way, adhesion to a polarizer can be further improved.

<Hydrophilic High Polymer>

The hydrophilic high polymer usable for the undercoating layer is a synthetic or natural hydrophilic macromolecular compound, with examples including gelatin, acylated gelatins such as phthalated gelatin and maleated gelatin, cellulose derivatives such as carboxymethyl cellulose and hydroxyethyl cellulose, grafted gelatins prepared by grafting acrylic acid, methacrylic acid or amide onto gelatin, polyvinyl alcohol, polyhydroxyalkyl acrylates, polyvinyl pyrrolidone, vinyl pyrrolidone-vinyl acetate copolymer, casein, agarose, albumin, sodium alginate, polysaccharide, agar, starch, grafted starch, polyacrylamide, homo- and copolymers of N-substituted acrylamides or N-substituted methacrylamides, and partial hydrolysis products of the hydrophilic polymers recited above. These may be used alone or as mixtures. Among those hydrophilic polymers, gelatin and derivatives thereof are preferred over the others.

The undercoating layer can be formed by applying a coat of a coating composition containing the hydrophilic high polymer as recited above to the surface of the easily-adhesive layer. The coating composition is made up of the hydrophilic high polymer as recited above and a solvent. Examples of such a solvent include water and alcohol compounds. Examples of a coating method adoptable therein include commonly known coating methods, such as a dip coating method, an air-knife coating method, a curtain coating method, a roller coating method, a wire-bar coating method, a gravure coating method, and an extrusion method using the hopper disclosed in U.S. Pat. No. 2,681,294.

The suitable thickness of the undercoating layer is in a range of 0.05 to 1.0 µm. When it has a thickness thinner than 0.05 µm, the undercoating layer is difficult to ensure sufficient adhesion; while, when it has a thickness increased beyond 1.0 µm, its effect on adhesion becomes saturated.

To the undercoating layer, an ultraviolet absorbent can also be added, if needed.

From the viewpoint of delivering high ultraviolet absorption power and contributing to satisfactory liquid-crystal display performance, those preferably usable as the ultraviolet absorbent are ultraviolet absorbents which ensure a transmittance of 0 to 50%, preferably 0 to 30%, far preferably 0 to 10%, at a wavelength of 380 nm and a transmittance of 80% to 100%, preferably 85% to 100%, far preferably 90% to 100%, at a wavelength of 600 nm in the overall polarizing plate protective film after they are added to the film's constituent layers.

In addition, the amount of ultraviolet absorbents used is adjusted preferably to 0.1 to 10 mass %, far preferably to 0.5 to 5 mass %, of the total solids in the undercoating layer.

<<Other Layers>>

In an embodiment of the invention other layers including a high refractive-index layer, an medium refractive-index layer, a low refractive-index layer and an antistatic layer can be provided. These layers are illustrated below.

<High Refractive Index Layer and Medium Refractive Index Layer>

The present film is provided with a high refractive index layer and a medium refractive index layer, and thereby it can have an enhanced antireflective property.

Hereinafter, the high refractive index layer and the medium refractive index layer are sometimes collectively called a high refractive index layer. Incidentally, the adjectives "high", "medium" and "low" in the terms "high refractive index layer", "medium refractive index layer" and "low refractive index layer" describe a relative magnitude relation among refractive indexes of layers. As for the refractive index relation with the transparent substrate, it is preferable that the relations, transparent substrate>low refractive index layer and high refractive index layer>transparent substrate, are satisfied.

Sometimes in this specification a high refractive index layer, a medium refractive index layer and a low refractive index layer are collectively called "an antireflective layer".

When an antireflective layer is formed by providing a low refractive index layer on a high refractive index layer, the refractive index of the high refractive index layer is preferably from 1.55 to 2.40, far preferably from 1.60 to 2.20, further preferably from 1.65 to 2.10, especially preferably from 1.80 to 2.00.

When an antireflective layer is formed by providing a medium refractive index layer, a high refractive index layer and a low refractive index layer in order of increasing distance from the substrate, the refractive index of the high refractive index layer is preferably from 1.65 to 2.40, far preferably from 1.70 to 2.20. And the refractive index of the medium refractive index layer is adjusted to a value intermediate between the refractive index of the low refractive index layer and that of the high refractive index layer. The refractive index of the medium refractive index layer is preferably from 1.55 to 1.80.

For formation of the high refractive index layer and the medium refractive index layer, inorganic particles containing $TiO_2$ as a main component are used in a state of dispersion.

The dispersion is prepared by dispersing those inorganic particles into a dispersion medium in the presence of a dispersing agent.

The high refractive index layer and the medium refractive index layer for use in an embodiment of the invention are preferably formed as follows: Coating compositions for the high refractive index layer and the medium refractive index layer are prepared preferably by further adding binder precursors required for matrix formation (e.g., ionizing radiation curable multifunctional monomers or oligomers) and photopolymerization initiators to their individual dispersions of inorganic particles dispersed in dispersion media, and applied to a transparent substrate, and further cured through cross-linking reaction or polymerization reaction of the ionizing radiation curable compounds (e.g., the multifunctional monomers or oligomers), thereby forming the high refractive index layer and the medium refractive index layer, respectively.

Further, it is preferable that the binders of the high refractive index layer and the medium refractive index layer are made to undergo cross-linking reaction or polymerization reaction with dispersing agents simultaneously with or subsequently to coating of the layers. The binders thus prepared for the high refractive index layer and the medium refractive index layer, respectively, have structures that anionic groups of the preferable dispersing agents as recited hereinbefore are integrated into the binders by cross-linking or polymerization reaction of the dispersing agents with ionizing radiation curable multifuctional monomers or oligomers. In addition, the anionic groups integrated into the binders of the high refractive index layer and the medium refractive index layer have a function of holding a dispersion state of inorganic particles and the cross-linked or polymerized structures impart film forming power to the binders. Thus the inorganic particles-incorporated high and medium refractive index layers show improvements in mechanical strength, chemical resistance and weather resistance.

In the high refractive index layer, the amount of binder added is 5 to 80 mass % of the total solids content in a coating composition for the layer.

The content of inorganic particles in the high refractive index layer is preferably 10 to 90 mass %, far preferably 15 to 80 mass %, particularly preferably 15 to 75 mass %, of the high refractive index layer. Two or more kinds of inorganic particles may be used as a combination in the high refractive index layer.

In the case of having a low refractive index layer on the high refractive index layer, it is preferable that the refractive index of the high refractive index layer is higher than the refractive index of a transparent substrate.

In the high refractive index layer, a hinder obtained by cross-linking reaction or polymerization reaction of an ionizing radiation curable compound containing an aromatic ring, an ionizing ration curable compound containing a halogenation element other than fluorine (e.g., Br, I, Cl), or an ionizing radiation curable compound containing an S, N or P atom can also be used to advantage.

The thickness of the high refractive index layer can be designed appropriately according to its intended use. When the high refractive index layer is used as an optical interference layer, the thickness thereof is preferably from 30 to 200 nm, far preferably from 50 to 170 nm, particularly preferably from 60 to 150 nm.

As to haze of the high refractive index layer, the lower the better unless the layer contains particles imparting an anti-glare function thereto. The haze is preferably 5% or below, far preferably 3% or below, particularly preferably 1% or below.

The high refractive index layer is preferably formed on the transparent substrate directly or via another layer.

<Low Refractive Index Layer>

For reduction in reflectance of the present film, it is required to provide a low refractive index layer.

The refractive index of the low refractive index layer is preferably from 1.20 to 1.46, far preferably from 1.25 to 1.46, particularly preferably from 1.30 to 1.46.

The thickness of the low refractive index layer is preferably from 50 to 200 nm, far preferably from 70 to 100 nm. The haze of the low refractive index layer is preferably 3% or below, far preferably 2% or below, especially preferably 1% or below. The concrete strength of the low refractive index layer, as evaluated by the pencil hardness test under a load of 500 g, is preferably at least H, far preferably at least 2H, especially preferably at least 3H.

In addition, for improvement in soil resistance of an optical film, it is appropriate that the contact angle of the film surface with respect to water be 90 degrees or more, preferably 95 degrees or more, particularly preferably 100 degrees or more.

The curable composition for forming the low refractive index layer is preferably a composition containing (A) a fluorine-containing polymer, (B) inorganic particles and (C) an organosilane compound.

In the low refractive index layer, a binder is used for dispersion and fixation of fine particles. Although the binders recited in the description of the hard coating layer are usable, the binder used in the low refractive index layer is preferably a binder having a low refractive index in itself, such as a fluorine-containing polymer or a fluorine-containing sol-gel material. The material suitable as a fluorine-containing polymer or a fluorine-containing sol-gel material is a material capable of forming cross-links by application of heat or ionizing radiation and ensuring a kinetic friction coefficient of 0.03 to 0.30 and a water contact angle of 85° to 120° at the surface of the low refractive index layer formed.

<Soil-Resistant Layer>

A soil-resistant layer can be provided as the topmost layer of the present film. The soil-resistant layer is a layer which lowers the surface energy of an antireflective layer and resists adhesion of hydrophilic or lipophilic soil.

The soil-resistant layer can be formed by use of a fluorine-containing polymer and an anti-soiling agent.

The thickness of the soil-resistant layer is preferably from 2 to 100 nm, far preferably from 5 to 30 nm.

<Antistatic Layer>

It is also effective to provide an antistatic layer, and the antistatic layer is designed to ensure the characteristics mentioned below.

More specifically, the antistatic layer in the invention is designed so that a low-electrification substrate provided with the antistatic layer has a haze of 3% or below, and conductivity is imparted to the antistatic layer so that the surface electric resistance of a surface layer of the resultant polarizing plate protective film is adjusted to a range of $1 \times 10^6$ to $1 \times 10^{11} \Omega$. By providing the antistatic layer, dust adhesion troubles traceable to static electricity produced in a manufacturing process of handling a plastic substrate can be inhibited.

The antistatic layer is a layer containing conductive meta oxide grains and, in most cases, further containing a binder. Herein, it is preferable that the conductive metal oxide grains used are acicular grains and the ratio of the long axis to the short axis (long axis/short axis ratio) in each grain is from 3 to 50. The grains having their long axis/short axis ratios in the range of 10 to 50 are used to particular advantage. The short axes of such acicular grains are preferably in the range of 0.001 to 0.1 μm, particularly preferably in the range of 0.01 to 0.02 μm. And their long axes are preferably in the range of 0.1 to 5.0 μm, particularly preferably in the range of 0.1 to 2.0 μm.

Examples of a material for conductive metal oxide grains can include $ZnO$, $TiO_2$, $SnO_2$, $Al_2O_3$, $In_2O_3$, $MgO$, $BaO$, $MoO_3$ and compound oxides thereof. In addition, those obtained by doping the metal oxides recited above with different kinds of atoms can be given as other examples. Of these metal oxides, $SnO_2$, $ZnO$, $Al_2O_3$, $TiO_2$, $In_2O_3$ and $MgO$ are preferable, $SnO_2$, $ZnO$, $In_2O_3$ and $TiO_2$ are preferable by far, and $SnO_2$ in particular is preferable. Examples of a metal oxide further containing a different kind of element in a low proportion include $ZnO$ doped with Al or In, $TiO_7$ doped with Nb or Ta, $In_2O_3$ doped with Sn, and $SnO_2$ doped with Sb, Nb or a halogen element, wherein the proportion of each doped element is from 0.01 to 30 mole % (preferably from 0.1 to 10 mole %). When the proportion of the doped element is 0.01 mole % or more, sufficient conductivity can be imparted to the oxide or compound oxide as recited above; while, when the proportion is 30 mole % or below, the antistatic layer can avoid darkening by an increase in degree of blackening grains. Therefore, as the material used for conductive metal oxide grains in the invention, metal oxides or compound metal oxides containing small amounts of different kinds of elements aye preferred. In addition, materials containing oxygen defects in their crystal structures are also preferred. Of the above-recited conductive metal oxide grains containing small amounts of different kinds of atoms, antimony-doped $SnO_2$ grains, especially $SnO_2$ grains doped with antimony in a proportion of 0.2 to 2.0 mole %, are preferred over the others. Therefore, the use of metal oxide grains such as antimony-doped $SnO_2$ grains, whose long-axis and short-axis measurements are in the ranges specified above, is favorable for formation of a transparent antistatic layer having satisfactory conductivity.

Reasons why a transparent antistatic layer having satisfactory conductivity can be formed by using acicular metal oxide grains (e.g., antimony-doped $SnO_2$ grains) having their short-axis and long-axis measurements in the ranges specified above are supposed as follows. The tong axes of the acicular metal oxide grains inside the antistatic layer range along the directions parallel to the surface of the antistatic layer, but in the thickness direction of the layer the acicular metal oxide grains each merely occupy just the dimension of short-axis length. Since the acicular metal oxide grains are stretched out in the long-axis direction, they tend to be brought into contact with one another, compared with general spherical grains, and even a low content of metal oxide can deliver high conductivity. Therefore, the surface electric resistance can be lowered without loss of transparency. In addition, the short-axis length of the acicular metal oxide grains is generally shorter than or almost equal to the thickness of the antistatic layer, so there are not many protuberances from the surface. Even if there are quite a few protuberances, the protuberances from the surface are small, so they can be almost completely covered with a surface layer provided on the antistatic layer.

The antistatic layer for use in an embodiment of the invention generally contains a binder for dispersing and supporting conductive metal oxide grains. As a material for the binder, various polymers including an acrylic resin, a vinyl resin, a polyurethane resin and a polyester resin can be used. From the viewpoint of preventing resin powder from coming off, the binder is preferably a material prepared from a polymer (preferably an acrylic resin, a vinyl resin, a polyurethane resin or a polyester resin) and a carbodiimide compound by curing reaction. In the invention, from the viewpoints of maintaining good working surroundings and preventing aerial pollution, it is preferable that materials used as the polymer and the carbodiimide compound are both water-soluble or they are used in a dispersed-in-water state such as a state of an emulsion. In addition, the polymer has any of methylol groups, hydroxyl groups, carboxyl groups or amino groups so as to enable the curing reaction with the carbodiimide compound. Of these groups, hydroxyl and carboxyl groups, especially a carboxyl group, are preferred. The content of hydroxyl groups or carboxyl groups in the polymer is preferably from 0.0001 to 1 equivalent/kg, particularly preferably from 0.001 to 1 equivalent/kg.

Examples of an acrylic resin include homopolymers of any of acrylic monomers, such as acrylic acid, acrylic acid esters like alkyl acrylates, acrylamide, acrylonitrile, methacrylic acid, methacrylic acid esters like alkyl methacrylates, methacrylamide and methacrylonitrile, and copolymers obtained by polymerization of any two or more of the monomers recited above. Of these polymers, homopolymers of acrylic acid esters including alkyl acrylates, homopolymers of methacrylic acid esters including alkyl methacrylate and copolymers obtained by polymerization of any two or more of these (meth)acrylate monomers are preferred over the others. More specifically, homopolymers of any of 1-6C alkyl group-containing acrylates or methacrylates and copolymers obtained by polymerization of any two of these monomers are given as examples. The acrylic resin is a polymer obtained by using as main constituent monomers the composition as recited above and as a part of constituent monomers a monomer or monomers having, e.g., any of a methylol group, a hydroxyl group, a carboxyl group and an amino group for making cross-linking reaction with a carbodiimide compound possible.

Examples of a vinyl resin include polyvinyl alcohol, acid-modified polyvinyl alcohol, polyvinyl formal, polyvinyl butyral, polyvinyl methyl ether, polyolefin, ethylene-butadiene copolymer, polyvinyl acetate, vinyl chloride-vinyl acetate copolymer, vinyl chloride-(meth)acrylate copolymer and ethylene-vinyl acetate copolymer (preferably ethylene-vinyl acetate-(meth)acrylate copolymer). Of these polymers, polyvinyl alcohol, acid-modified polyvinyl alcohol, polyvinyl formal, polyolefin, ethylene-butadiene copolymer and ethylene-vinyl acetate copolymer (preferably ethylene-vinyl acetate-acrylate copolymer) are preferred over the others. As to the polyvinyl alcohol, the acid-modified polyvinyl alcohol, the polyvinyl formal, the polyvinyl butyral, the polyvinyl methyl ether and the polyvinyl acetate, polymers having hydroxyl groups as groups making cross-linking reaction with a carbodiimide compound possible are obtained by preserving, e.g., vinyl alcohol units in the polymers recited. As to the other polymers, cross-linkable polymers each can be prepared by using as a part of constituent monomers a monomer or monomers having, e.g., any of a methylol group, a hydroxyl group, a carboxyl group and an amino group.

Examples of the polyurethane resin include polyurethane derived from polyisocyanate and any one or a mixture of any two or more of a polyhydroxy compound (e.g., ethylene glycol, propylene glycol, glycerin, trimethylolpropane), aliphatic polyesterpolyol prepared by reaction between a polyhydroxy compound and a polybasic acid, polyetherpolyol (e.g., poly(oxypropylene ether)polyol, poly(oxyethylene-propylene ether)polyol), polycarbonatepolyol and polyethyleneterephthalatepolyol. With respect to the polyurethane resin, hydroxyl groups remaining unreacted after reaction between polyisocyanate and, say, polyol can be utilized as functional groups capable of undergoing cross-sinking reaction with a carbodiimide compound.

As the polyester resin, a polymer generally prepared by reaction between a polyhydroxy compound (e.g., ethylene glycol, propylene glycol, glycerin, trimethylolpropane) and a polybasic acid can be used. As to this polymer, hydroxyl groups and carboxyl groups remaining unreacted after reaction between the polybasic acid and, say, polyol can be utilized as functional groups capable of undergoing cross-linking reaction with a carbodiimide compound. Of course, a third component having a functional group like a hydroxyl group may be added.

Of the polymers recited above, acrylic resins and polyurethane resins, especially acrylic resins, are preferred over the others.

As the carbodiimide compound for use in the invention, a compound having more than one carbodiimide structure in its molecule is preferably used.

Polycarbodiimide is generally synthesized by condensation reaction of an organic diisocyanate. The organic diisocyanate used in synthesis of a compound having more than one carbodiimide structure in its molecule has no particular restriction on its organic groups. So, any of aromatic groups, aliphatic groups and mixtures thereof usable, but aliphatic groups in particular has an advantage in point of reactivity.

As raw materials for the synthesis, organic isocyanate, organic diisocyanate and organic triisocyanate are usable.

As the organic isocyanate, aromatic isocyanate, aliphatic isocyanate and a mixture thereof can be used.

To be concrete, 4,4'-diphenylmethane diisocyanate, 4,4-diphenyldimethylmethane diisocyanate, 1,4-phenylene diisocyanate, 2,4-tolylene diisocyanate, 2,6-tolylene diisocyanate, hexamethylene diisocyanate, cyclohexane diisocyanate, xylylene diisocyanate, 2,2,4-trimethylhexamethylene diisocyanate, 4,4'-dicyclohexylmethane diisocyanate, 1,3-phenylene diisocyanate and the like can be used. As for organic monoisocyanates, isophorone isocyanate, phenyl isocyanate, cyclohexyl isocyanate, butyl isocyanate, naphthyl isocyanate and the like are usable.

Alternatively, carbodiimide compounds available as commercial products, e.g., Carbodilite V-02-L2 (trade name, a product of Nisshinbo Industries, Inc.) can be used in the invention.

The proportion of the carbodiimide compounds added to the binder in the invention is preferably from 1 to 200 mass %, far preferably from 5 to 100 mass %.

In formation of the antistatic layer for use in the invention, a coating composition for forming the antistatic layer is prepared first by, e.g., adding the conductive metal oxide grains as recited above as they are or in a state of dispersion prepared by dispersing them into a solvent such as water (containing a dispersing agent and a binder, if needed) to an aqueous dispersion or solution containing the binder as mentioned above (e.g., including a polymer, a carbodiimide compound and appropriate additives), and by mixing them (and further performing dispersion treatment, if needed). Then, the coating solution prepared for forming the antistatic layer is applied to the surface of a plastic film according to a generally well-known coating method, such as a dip coating method, an air-knife coating method, a curtain coating method, wire-bar coating method, a gravure coating method or an extrusion coating method.

The thickness of the antistatic layer for use in an embodiment of the invention is preferably from 0.01 to 1 µm, far preferably from 0.01 to 0.2 µm. When the thickness is below 0.01 µm, the coating composition is difficult to coat uniformly, and the product obtained tends to cause unevenness in coating; while, when the thickness is beyond 1 µm, there sometimes occurs degradation in antistatic efficiency and abrasion resistance. It is appropriate that the proportion of the conductive metal oxide grains to the binder (the sum of the polymer and the carbodiimide compound) in the antistatic layer be from 10 to 1,000 mass %, preferably 100 to 500 mass %. When the proportion is below 10 mass %, sufficient antistatic effect cannot be produced; while, when the proportion is beyond 1,000 mass %, the haze value becomes too high.

In the antistatic layer for use in an embodiment of the invention and a surface layer described below, additives including a surfactant and a slipping agent can be used in combination. Examples of the surfactant include heretofore known anionic surfactants, cationic surfactants, amphoteric surfactants and nonionic surfactants. Examples of the slipping agent include natural wax, such as carnauba wax; phosphoric acid esters or amino salts of 8-22C higher alcohol; palmitic acid, stearic acid, behenic acid and esters thereof, and silicone compounds.

In an embodiment of the invention, a surface layer is provided on the antistatic layer. The surface layer is provided mainly for imparting adhesiveness to an adhesive layer and assisting a function of preventing conductive metal oxide grains from leaving the antistatic layer. As a material for the surface layer, through various polymers, such as acrylic resin, vinyl resin, polyurethane resin and polyester resin, can be generally used, the polymers described above as the binder in the antistatic layer are preferable.

As crosslinking agents for use in the surface layer, epoxy compounds are suitable. Examples of epoxy compounds used preferably include 1,4-bis(2',3'-epoxypropyloxy)butane, 1,3,5-triglycidyl isocyanurate, 1,3-diglycidyl-5-(γ-acetoxy-β-oxypropyl)isocyanurate, sorbitol polyglycidyl ethers, polyglycerol polyglycidyl ethers, pentaerythritol polyglycidyl ethers, digylcerol polyglycidyl ether, 1,3,5-triglycidyl (2-hydroxyethyl)isocyanurate, glycerol polyglycerol ethers and trimethylolpropane polyglycidyl ethers. Commercially available products of such epoxy compounds include DENACOL EX-521 and EX-641B produced by Nagase Chemicals Ltd.), but not limited to these products.

In formation of the surface layer for use in the invention, a coating composition for the surface layer is prepared first by, e.g., adding the polymer, epoxy compound and appropriate additives as mentioned above to a solvent such as water (including a dispersing agent and a binder, if needed), and by mixing them (and further performing dispersion treatment, if needed).

The surface layer can be formed by applying the coating solution prepared in the foregoing manner to the surface of the antistatic layer formed in the invention by use of a generally well-known coating method, such as a dip coating method, an air-knife coating method, a curtain coating method, wire-bar coating method, a gravure coating method or an extrusion coating method. The thickness of the surface layer is preferably from 0.01 to 1 µm, far preferably from 0.01 to 0.2 µm. When the thickness is below 0.01 µm, the surface layer is insufficient in function of preventing conductive metal oxide grains from leaving the antistatic layer; while, when the thickness is beyond 1 µm, the coating composition is difficult to coat uniformly, and the product obtained tends to cause unevenness in coating.

<Anticurl Layer>

Anticurl coating can also be given to the present film. Giving the anticurl coating means that an inwardly curling function is imparted to the surface to which the anticurl coating is given, and the coating given has an action of inhibiting one side of a transparent resin film, which has undergone some surface treatment, from inwardly curling when the film have received surface treatments different in kind and degree on both sides, respectively.

A form may be adopted that the anticurl layer is provided on the side opposite to the antiglare or antireflection layer side of the substrate or, as there is the case of coating, e.g., an easily-adhesive layer on one side of the transparent resin film, a form of applying the anticurl coating to the other side may be adopted.

<Primer Layer or Inorganic Thin Layer>

In the present film, gas barrier efficiency can be enhanced by providing a heretofore known primer layer or inorganic thin layer between the substrate and a stack of layers.

As the primer layer, though a layer of acrylic resin, epoxy resin, urethane resin, silicone resin or the like can be used, a hybrid of organic and inorganic layers is preferably used. As the inorganic thin layer, an inorganic vapor deposition layer or a dense and thin inorganic coating film formed by sol-gel method is preferred. As the inorganic vapor deposition layer, an evaporated silica, zirconia or alumina layer is preferred. Such inorganic vapor deposition layers can be formed by a vacuum evaporation method or a sputtering method.

<Curing>

After drying the solvent, the present film can be cured by passage in the form of web through a zone for curing every coating layer by application of ionizing radiation and/or heat.

The ionizing radiation used in the invention has no particular restriction on its kind, so it can be selected appropriately from ultraviolet rays, electron beams, near ultraviolet rays, visible light, near infrared rays, infrared rays or X rays with reference to the kind of a curable composition for film formation. However, ultraviolet rays and electron beams can be used to advantage. And ultraviolet rays in particular are preferable in point of simple handling and easy generation of high energy.

As a light source of ultraviolet rays capable of causing photopolymerization of ultraviolet reactive compounds, any of light sources capable of generating ultraviolet radiation can be used. Examples of such a light source include a low-pressure mercury lamp, a medium-pressure mercury lamp, a high-pressure mercury lamp, an ultrahigh-pressure mercury lamp, a carbon arc lamp, a metal halide lamp and a xenon lamp. In addition, ArF excimer laser, KrF excimer laser, an excimer lamp or synchrotron radiation can also be used. Of these light sources, a ultrahigh-pressure mercury lamp, a high-pressure mercury lamp, a low-pressure mercury lamp, carbon arc, xenon arc and a metal halide lamp can be used to advantage.

Similarly thereto, electron beams can be used. Examples of usable electron beams include electron beams emitted from various types of electron beam accelerators, such as a Cockcroft-Walton accelerator, a vandegraph accelerator, a resonance transformation accelerator, an insulated-core transformer accelerator, a Dynamitron accelerator and a high-frequency accelerator, and having energy of 500 to 1,000 keV, preferably 100 to 300 keV.

Although the irradiation conditions differ according to what type of lamp is used, the amount of light irradiated is preferably 10 mJ/cm$^2$ or more, far preferably from 50 mJ/cm$^2$ to 10,000 mj/cm$^2$, particularly preferably from 50 mJ/cm$^2$ to 2,000 mJ/cm$^2$. Herein, the suitable distribution of irradiation quantity in the width direction of web is that the irradiation quantities at positions ranging to the both edges are from 50 to 100%, preferably from 80 to 100%, of the maximum irradiation quantity at the central position.

In the invention, it is preferable to cure at least one layer stacked on the substrate in a process of irradiating the layer with ionizing radiation in an atmosphere having an oxygen concentration of 10 vol % or below while applying heat so as to maintain the film surface temperature at 60° C. or higher for a lapse of at least 0.5 second from the start of irradiation with the ionizing irradiation.

Alternatively, it is also preferable to applying heat in an atmosphere having an oxygen concentration of 3 vol % or below simultaneously with and/or successively to irradiation with ionizing radiation.

It is advantageous for the low refractive index layer in particular, which is the outermost layer and small in thickness, to be cured by the aforementioned method. The curing reaction is accelerated by heating to result in formation of a coating having excellent physical strength and chemical resistance.

The irradiation time of ionizing radiation is preferably from 0.7 to 60 seconds, far preferably from 0.7 to 10 seconds. In such a range, the curing reaction can reach completion and sufficient curing can be achieved. Additionally, it is advantageous for the irradiation time to be adjusted to such a range since longtime maintenance of a low-oxygen condition requires upsizing of equipment and a large amount of inert gas.

The film formation by crosslinking reaction or polymerization reaction of an ionizing radiation-curable compound in an atmosphere having an oxygen concentration of 6 vol % or below is preferred. The oxygen concentration of 4 vol % or below is preferable by far, that of 2 vol % or below is further preferable, and that of 1 vol % is particularly preferable. Such a range of oxygen concentration has an advantage in point of production cost, because the reduction in oxygen concentration is not greater than necessary and the use of inert gas, such as nitrogen, in a large amount is not required.

As to a method of reducing the oxygen concentration to 10 vol % or below, it is preferable to replace the atmosphere (having a nitrogen concentration of about 79% vol % and an oxygen concentration of about 21 vol %) with a different gas, notably nitrogen (purge with nitrogen).

When the curing is carried out, it is appropriate that the film surface be heated at a temperature from 60° C. to 170° C. The heating at temperatures lower than 60° C. has little effect on the curing, while the heating at temperatures higher than 170° C. causes problems including deformation of the substrate. The temperatures more appropriate for the heating are in the range of 60° C. to 100° C. The film surface refers to the surface of a coating to be cured. The duration of the film temperature as specified above from the start of UV irradiation is preferably from 0.1 to 300 sec, far preferably from 0.1 to 10 sec. When the duration of the film surface temperature is above the foregoing lower limit, the reaction in the curable composition forming the film can be accelerated; while, when the duration is below the foregoing upper limit, there occurs neither degradation in optical property of the firm nor a production problem, such as upsizing of equipment.

The method for heating the film surface, though has no particular restrictions, is preferably a method of bringing a healed roll into contact with the film, a method of blowing hot nitrogen gas on the film, or a method of irradiating the film with far infrared or infrared rays. Alternatively, it is possible to utilize the method disclosed in Japanese Patent No. 2523574 where the heating is performed by feeding a heated medium, such as hot water, steam or oil, through a rotating metal roll. As another heating tool, a dielectric, heating roll or the like may be utilized.

In the formation of film constituted of two or more layers, ultraviolet irradiation may be carried out at every time one constituent layer is provided or it may be carried out after all the constituent layers are coated. These manners of ultraviolet irradiation may be adopted in combination. In point of productivity, it is preferable to carry out ultraviolet irradiation after all the constituent layers are coated.

When an ultraviolet absorbent is incorporated in the hard coating layer, it may occur in the invention that irradiation with ultraviolet rays from the side where the hard coating layer is applied causes a drop in ultraviolet dose in the region near to the substrate through ultraviolet absorption by the ultraviolet absorbent to result in insufficiencies of film strength and adhesion to the substrate. In such a case, irradiation with light from the substrate side is preferable in point of improvement in adhesion to the substrate.

In the invention, at least one of multiple layers coated on the substrate can be cured by multiple irradiations with ionizing radiation. In this case, it is preferable that at least twice irradiations with ionizing radiation are carried out in reaction chambers maintained at an oxygen concentration lower than 3 vol % and placed in series. By carrying out multiple irradiations with ionizing radiation in reaction chambers having the same condition of a low oxygen concentration, it becomes possible to get a reaction time required for curing with efficiency.

When the production speed is increased particularly for attainment of high productivity, multiple irradiations with ionizing radiation becomes necessary for ensuring ionizing radiation energy required for curing reaction.

When an upper layer is provided on a lower layer within a period of time when the lower layer's curing rate (100 minus a residual functional group content) is some value smaller than 100% and cured with ionizing radiation and/or heat, the adhesion between the lower layer and the upper layer can be enhanced favorably so long as the lower layer comes to have a curing rate higher than the curing rate it had before the upper layer is provided.

<Handling>

For manufacturing the present film continuously, a process of continuously feeding a roll of substrate film as it is wound off, a process of applying and drying layers of coating solutions, a process of curing the layers applied, and a process of taking up the substrate film having the cured layers are carried out.

More specifically, a roll of substrate film is continuously wound off and fed into a clean room, electrostatic charge on the substrate film is removed with a static charge neutralization apparatus installed in the clean room, and then extraneous matter adhering to the substrate film is removed with a dust arrester. Subsequently thereto, a layer of coating solution is applied to the substrate film in a coating section installed in the clean room, and the thus coated substrate film is fed into a drying room and dried therein.

The substrate film having the dried coating layer is fed into a cure room from the drying room, and undergoes curing trough polymerization of monomer(s) contained in the coating layer. Furthermore, the substrate film having the cured layer is fed into a setting section to result in completion of curing, and then the substrate film having the cure-completed layer is wound into a roll.

The foregoing processes may be carried out for every layer formation, or it is possible to carry out continuous formation of two or more layers by installing two or more processing units in series, which are each a combination of a coating section, a drying room and a curing section.

For making the present film, it is appropriate that microfiltration operations of coating solutions be performed and, at the same time, the coating process in the coating section and the drying process in the drying room be carried out under an air atmosphere of high cleanliness, and besides, dirt and dust on the film be fully eliminated before the coating process is carried out. The air cleanliness in the coating and drying processes is, based on the standard of cleanliness in accordance with U.S. Standard 209E, preferably Class 10 or more (which permits 353 or less particles having sizes of 0.5 µm or greater per cubic meter of air), far preferably Class 1 (which permits 35.5 or less particles having sizes of 0.5 µm or greater per cubic meter of air). In addition to the coating and drying processes, it is preferable that the air cleanliness is high in the feeding and winding processes also.

<<Polarizing Plate>>

The polarizing plate according to an embodiment of the invention has a polarizer and the present protective film for a polarizing plate.

And it is preferable that the polarizer is sandwiched between the present protective film and another protective film other than the present protective film, and the other protective film preferably has a film made up mainly of cellulose ester film.

It is advantageous for the other protective film to have a viewing angle-compensating function. In addition, it is preferable that the other protective film has an optically anisotropic layer.

The present protective film (optical film) constitutes a polarizing plate in a state of being stuck to at least one surface of the polarizer.

To the other surface of the polarizer, it is favorable for protection of the polarizing plate to snick the other protective film having moisture permeability of 700 to 3,000 g/m²·day, preferably 1,000 to 1,700 g/m²·day. As the other protective film specified above, commonly used triacetyl cellulose (TAC) is suitable.

Although commonly used cellulose acetate film may be used, it is also possible to use cellulose acetate film made by solution film-formation method and stretched at a stretch ratio of 10 to 100% in the width direction of the film in a roll form.

Alternatively, while it has on one side the present protective film, the polarizing plate according to an embodiment of the invention may have as a protective film on the other side an optically-compensatory film provided with an optically anisotropic layer including a liquid crystalline compound.

Additionally, while it has on one side the present protective film, the polarizing plate according to an embodiment of the invention may have as the other protective film a film with Re of 0 to 10 nm and Rth of −20 to +20 nm (see, e.g., JP-A-2005-301227, paragraph 0095).

As polarizers, there are known an iodine polarizer, a dye polarizer using a dichroic dye and a polyene polarizer. The iodine polarizer and the dye polarizer are generally formed using polyvinyl alcohol film.

It is also preferable that the other protective film of two protective films of a polarizer is an optically-compensatory film having an optically-compensatory layer including an optically anisotropic layer. The optically-compensatory film (retardation film) can improve viewing-angle characteristics of a liquid crystal display screen.

Although known optically-compensatory films can be used herein, the optically-compensatory films disclosed in JP-A-2001-100042 are preferred in point of viewing angle extension.

When it is incorporated in a liquid crystal display device, the present protective film is preferably disposed on the viewing side opposite to the side of a liquid crystal cell.

<<Liquid Crystal Display Device>>

In a liquid crystal display device according to an embodiment of the invention, at least one of polarizing plates between which a liquid crystal cell is sandwiched is the aforesaid polarizing plate according to an embodiment of the invention.

It is preferable that the liquid crystal display device according to an embodiment of the invention further has a brightness enhancing film, and the protective film and the brightness enhancing film adjacent thereto are preferably in close contact with each other.

In other words, the present film and polarizing plate can be advantageously used in image display devices including a liquid crystal display device, and preferably used as the topmost layer of the display.

A liquid crystal display device has a liquid crystal cell and two polarizing plates disposed on both side of the liquid crystal cell. The liquid crystal cell holds liquid crystal between two electrode plates. In addition, an optically anisotropic layer is arranged between the liquid crystal cell and one of the polarizing plates or, in some cases, two optically anisotropic layers are arranged between the liquid crystal cell and the two polarizing plates each. Herein, the present polarizing plate is preferably disposed only on the viewing side.

The crystal cell is preferably a TN-mode, VA-mode, OCB-mode, IPS-mode or ECB-mode crystal cell.

<TN Mode>

In a TN-mode liquid crystal cell, rod-shaped liquid crystalline molecules are aligned in a substantially horizontal direction, and that in a state of being twisted by 60 to 120 degrees, when no voltage is applied thereto.

TN-mode crystal cells are prevailingly utilized for color TFT liquid crystal display devices, and described in an abundant technical literature.

<VA Mode>

In a VA-mode liquid crystal cell, rod-shaped liquid crystalline molecules are aligned in a substantially vertical direction when no voltage is applied.

Examples of a VA-mode liquid crystal cell include (1) a strict sense of VA-mode liquid crystal cell in which rod-shaped liquid crystalline molecules are aligned in a substantially vertical direction when no voltage is applied thereto, but they are forced to align in a substantially horizontal direction by application of a voltage thereto (as disclosed in JP-A-2-176625), (2) a multidomain VA-mode (MVA-made) liquid crystal cell which ensures viewing angle extension (as described in SID 97 Digest of Tech. Papers (preprints) 28, p. 845 (1997)), (3) an n-ASM-mode liquid crystal cell in which rod-shaped liquid crystalline molecules are aligned in a substantially vertical direction when no voltage is applied thereto, but they are brought into a twisted multidomain alignment by application of a voltage thereto (as described in preprints of Nippon Ekisho Toronkai (Symposium on Liquid Crystal), pp. 58-59 (1998)), and (4) a SURVAIVAL-mode liquid crystal cell (announced at LCD International 98).

<OCB Mode>

OCB-mode liquid crystal cells are liquid crystal cells of a bend alignment mode in which rod-shaped liquid crystalline molecules in the upper part of a liquid crystal cell and those in the lower part are forced to align (symmetrically) in substantially opposite directions, and they are disclosed in U.S. Pat. Nos. 4,583,825 and 5,410,422. Since the rod-shaped liquid crystal molecules are symmetrically aligned in an upper part and a lower part of the liquid crystal cell, the bend alignment mode liquid crystal cell has an optically self-compensation function. Therefore, this liquid crystal mode is referred to as an OCB (Optically Compensatory Bend) liquid crystal mode. The liquid crystal display of the bend alignment mode has an advantage of high response speed.

<IPS Mode>

An IPS-mode liquid crystal cell adopts a mode of switching by application of a lateral electric field to nematic liquid crystal, and details thereof are described in *Proc. IDRC* (Asia Display '95), pp. 577-580 and pp. 707-710.

<ECB Mode>

In an ECB-mode liquid crystal cell, rod-shaped liquid crystalline molecules are aligned in a substantially horizontal direction. The ECB mode is one of liquid crystal display modes having the most simple structures, and described, e.g., in JP-A-5-203946.

<Brightness Enhancing Film>

As the brightness enhancing film, it is possible to use a polarization changing element having a function of separating light emitted from a light source (backlight) into transmission polarized light and reflection polarized light or scattering polarized light. This brightness enhancing film utilizes recurrent light of reflection polarized light or scattering polarized light from backlight and thereby can improve emission efficiency of linear polarized light.

An example of such an element is an anisotropic refection polarizer. As an example of the anisotropic reflection polarizer, mention may be made of an anisotropic multiple thin film which can transmit linear polarized light in one direction of vibration and reflect linear polarized light in the other direction of vibration. As an example of the anisotropic multiple thin film, mention may be made of DBEF made by 3M (see, e.g., JP-A-4-268505). As another example of the anisotropic reflection polarizer, mention may be made of a complex of a cholesteric liquid crystal layer and a λ/4 plate. As an example of such a complex, mention may be made of PCF as a product of Nitto Denko Corporation (see, e.g., JP-A-11-231130). As still another example of the anisotropic reflection polarizer, mention may be made of a reflection grid polarizer. Examples of the reflection grid polarizer include a metal lattice reflection polarizer, which has undergone micromachining of metal and delivers reflection polarized light even in the visible region (see, e.g., U.S. Pat. No. 6,288,840), and a material having fine particles of metal in a high polymer matrix and having undergone stretching (see, e.g., JP-A-8-184701).

Still another example of the foregoing element is an anisotropic scattering polarizer. As an example of the anisotropic scattering polarizer, mention may be made of DRP produced by 3M (see U.S. Pat. No. 5,825,543).

A further example of the foregoing element is a polarizer enabling polarization change in one pass. For example, such a polarizer may be a polarizer using Smectic C* (see, e.g., JP-A-2001-201635). An anisotropic diffraction grating is also usable.

In the liquid crystal display device using a brightness enhancing film, it is preferable that the polarizing plate using the present polarizing plate protective film is used only as the polarizing plate on the viewing side and the film on the side adjoining the brightness enhancing film on the backlight side is a polarizing plate using a film whose Re and Rth are both below 300 nm. By designing in such a way, birefringence interference can be suppressed, rainbow-like variations and change in tint can be substantially improved.

It is preferable by far to use a film having Re of 0 to 10 nm and Rth of −30 to +25 nm.

For example, TAC (made by FUJIFILM Corporation) is suitable as the foregoing film, and especially suitable examples include Z-TAC (made by FUJIFILM Corporation), O-PET (made by Kanebo Ltd.) and Altesta film (made by Mitsubishi Gas Company Industry, Inc.).

In the case of using a brightness enhancing film, it is favorable for prevention of moisture infiltration and suppression of light leakage to bring the polarizing plate and the brightness enhancing film into absolute contact with each other. An adhesive used for sticking the brightness enhancing film to the polarizing plate has no particular limitation. For example, the adhesive can be chosen appropriately from among adhesives containing as their base polymers acrylic polymer, silicone polymer, polyester, polyurethane, polyamide, polyvinyl ether, vinyl acetate-vinyl chloride copolymer, modified polyolefin, epoxy polymer, fluoropolymer and natal or synthetic rubber, respectively. It is particularly advantageous to use a base polymer having excellent optical transparency, showing moderate wettability, cohesive property and adhesive tackiness, and having high weather resistance and heat resistance.

<Touch Panel>

The present film can be applied to touch panels as disclosed in JP-A-5-127822 and JP-A-2002-48913.

<Organic Electroluminescent Device>

The present film can be used as a substrate (base film) and a protective film of an organic electroluminescent device.

When the present film is used in an organic electroluminescent device, the descriptions in JP-A-11-335661, JP-A-11-335368, JP-A-2001-192651, JP-A-2001-192652, JP-A-2001-192653, JP-A-2001-335776, JP-A-2001-247859, JP-A-2001-181616, JP-A-2001-181617, JP-A-2002-181816, JP-A-2002-181617 and JP-A-2002-056876 are applicable. Furthermore, it is preferable that the descriptions in JP-A-200-148291, JP-A-2001-221916 and JP-A-2001-231443 can be used in combination with those cited above.

<<Measurement Methods>>

Methods for measuring various physical quantities specified in this specification are described below.

<Moisture Permeability>

To measurement of moisture permeability can be applied the methods described in *Kobunshi no Bussei II* (Kobunshi Jikken Koza 4, published by Kyoritsu Shuppan), pp. 285-294: Measurements of amounts of vapors permeated (a mass method, a thermometer method, a vapor pressure method and a adsorbed amount method). In the intention 70-mm-φ film samples are each allowed to stand for 24 hours in the 60°

C.-95% RH atmosphere for humidity conditioning, and moisture permeability of each sample is calculated from the following equation in accordance with JIS Z-0208:

Moisture permeability=moisture content per unit area (g/m²)after moisture conditioning−moisture content per unit area(g/m²)before moisture conditioning.

<Haze>

Total haze (H), internal haze (Hi) and surface haze (Hs) of a film prepared are evaluated by the following measurements.

(1) The total haze value (H) of a film prepared is measured according to JIS-K7136.

(2) Several drops of silicone oil are put on either side of the film prepared, and the resultant film is sandwiched between two 1-mm-thick glass plates (micro slide glass, product number S 9111, made by MATSUNAMI) so as to bring the two glass plates and the film prepared into optically absolute contact with one another. Under the thus created surface haze removal condition, haze measurement is made. Separately, silicone oil alone is sandwiched between the same two glass plates as used in the foregoing measurement and thereon a haze measurement is made. The internal haze (Hi) is determined as a difference between these two haze values measured.

(3) The surface haze (Hs) is calculated by subtraction of the internal haze (Hi) determined in (2) from the total haze (H) measured in (1).

<Hardness: Pencil Hardness>

The strength of films relating to the invention can be evaluated by pencil hardness testing according to JIS-K 5400.

Films having pencil hardness of 2H or higher are regarded as acceptable,

<Adhesion Evaluation>

Adhesion between two films or between a substrate and a coating layer can be evaluated by the following method.

In the film surface on the coating layer side, incisions spaced every 1 mm are made with a cutter knife in a grid pattern of 11 lines long by 11 lines wide, thereby carving 100 squares in total. Thereto, a pressure-sensitive adhesive polyester tape made by Nitto Denko Corporation (NO. 31B) is stuck by application of pressure, and allowed to stand for 24 hours. Thereafter, a peel test is repeated three times at the same place, and whether some of the squares are peeled off or not is examined by visual observation. The following A and B levels are regarded as acceptable.

A: The number of squares peeled off is below 2.
B: The number of squares peeled off is from 2 to 10.
C: The number of squares peeled off is greater than 10.

<Spectral Characteristic>

A sample measuring 13 mm×40 mm in size is examined for transmittance at wavelengths ranging from 300 to 450 nm in the 25° C.-60% RH atmosphere by means of a spectrophotometer (U-3210, made by Hitachi Ltd.).

The b value is measured by a color-difference meter, Model SZ-Σ90, made by NIPPON DENSHOKU.

<Extraneous Light Reflecting Property>

Sensory evaluation of a property of reflecting extraneous light is made on a liquid crystal display device provided with an optical film-laminated polarizing plate on its viewing side. In the evaluation, a plurality of display devices are arranged in parallel and observed at the same time, thereby performing relative comparison. Degrees of extraneous light reflections in black tints (black images) are observed in the position facing each display squarely at power-on time and at power-off time, respectively, and comparison between them is made on each film. The following criteria are adopted for the evaluation, and the levels A and B are regarded as acceptable.

A: Extraneous light reflections are not annoying.
B: Extraneous light reflections are perceivable, but they are little annoying.
C: Extraneous light reflections are perceivable and a little annoying.
D: Extraneous fight reflections are rather annoying.

<Light Stability>

Polarizing plates made are each set on an EYE Super UV tester (a metal halide lamp, made by Iwasaki Electric Co. Ltd.), and irradiated for 200 hours with ultraviolet light of a 70 mW/cm² intensity from the side of their respective antireflective laminates. Then, visual observation of discoloration thus caused in each polarizing plate is made.

A: No discoloration is observed.
B: Faint yellow discoloration is observed.
C. Yellow discoloration is observed.

<Evaluation of Light Leaks after High-Humidity and Low-Humidity Treatments (Evaluation of Unevenness in Perimeter>

After 50-hour treatment under a 60° C.-90% RH or 70° C.-10% RH condition, each of the liquid crystal display devices was allowed to stand for 2 hours in a 25° C.-60% RH atmosphere. Then, each liquid crystal display device is placed in a black-display mode, and visual evaluation of light leakage from the front is made by a plurality of observers. The following levels A and B are regarded as acceptable.

A: No light leakage is observed.
B: Light leakage is hardly noticeable.
C: Light leakage is plainly observed.

EXAMPLES

The invention will now be illustrated in more detail by reference to the following examples, but embodiments of the invention should not be construed as being limited to these examples.

In the following description, the unit "parts" in which every amount is expressed is by mass (weight) unless otherwise indicated.

Example 1

Making of Polarizing Plate Protective Film

<Formation of Cycloolefin Film with Easily-Adhesive Layer>

Corona discharge treatment was given to one surface of cycloolefin film 1 (ZEONOA FILM ZF14-100, a product of Zeon Corporation, 100 µm in thickness and insoluble in solvents having dielectric constants of 10 or more), namely the surface to form an adhesive interface to an easily-adhesive layer, and to the thus treated surface was applied a coating solution S-1 in such an amount as to provide a dry thickness of 90 nm, thereby forming an easily-adhesive layer (S1). Furthermore, easily-adhesive layers (S2, S3) were each formed in the same manner as S1, except that the dry thickness of S2 was adjusted to 0.5 µm and that of S3 to 30 nm.

| Composition of Coating Solution S-1 for Easily-adhesive layer | |
|---|---|
| Styrene-butadiene latex (solids content: 43%) | 300 parts by mass |
| Sodium salt of 2,4-Dichloro-6-hydroxy-s-triazine (8%) | 49 parts by mass |
| Distilled water | 1,600 parts by mass |

| Composition of Coating Solution S-2 for Easily-adhesive layer | |
| --- | --- |
| Polyether H | 10 parts by mass |
| Toluene | 90 parts by mass |
| Composition of Coating Solution S-3 for Easily-adhesive layer | |
| APZ6601 | 100 parts by mass |
| Isopropyl alcohol | 67 parts by mass |

The compounds used in the foregoing compositions, respectively, are described below.

Polyether H: Polyolefin resin with terminal hydroxyl groups, produced by Mitsubishi Chemical Corporation APZ6601. Amino group-containing silicone compound, produced by Nippon Unicar Company Ltd.

<Formation of Hard Coating Layer>
(Preparation of Sol a-1)

In a reaction vessel equipped with a stirrer and a reflux condenser, 120 parts of methyl ethyl ketone, 100 parts of acryloxypropyltrimethoxysilane (KBM-5103, produced by Shin-Etsu Chemical Co., Ltd.) and 3 parts of diisopropoxy-aluminum ethylacetoacetate were placed, mixed with one another, then further admixed with 30 parts of ion-exchanged water, and underwent reaction at 60° C. for 4 hours. Thereafter, the reaction mixture was cooled to room temperature, thereby preparing a sol a-1. The mass-average molecular weight of sol a-1 was found to be 1,800, and besides, it was ascertained that all of the polymeric components higher than oligomers had their molecular weight in the range of 1,000 to 20,000. Moreover, gas chromatography analysis showed that acryloxypropyltrimethoxysilane as a raw material for the reaction didn't remain at all.

(Preparation of Sol a-2)

In a 1000-ml reaction vessel equipped with a thermometer, a nitrogen feed tube and a dropping funnel, 187 g (0.080 mol) of acryloxypropyltrimethoxysilane, 27.2 g (0.20 mol) of methyltrimethoxysilane, 320 g (10 mol) of methanol and 0.06 g (0.001 mol) of KF were placed, and thereto 15.1 g (0.86 mol) of water was gradually added dropwise with stirring at room temperature. After the conclusion of the dropwise addition, the admixture was stirred for 3 hours at room temperature, and flier heated under reflex of methanol for 2 hours with stirring. Then, low-boiling components were distilled away under reduced pressure and filtration was performed, thereby preparing 120 g of sol a-9. As a result of GCP measurement on the thus obtained substance, it was found that the mass-average molecular weight of the sol was 1,500 and 30% of the polymeric components higher than oligomers were those having their molecular weight in a range of 1,000 to 20,000.

In addition, it was ascertained from $^1$H-NMR measurements that the structure of the substance obtained was a structure represented by the following structural formula.

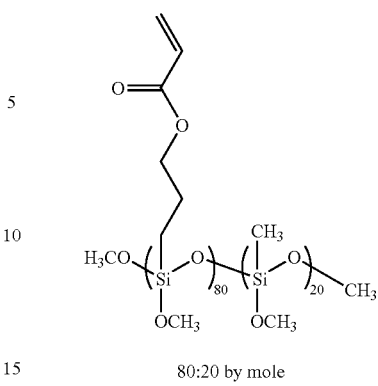

80:20 by mole

Furthermore, it was found by $^{29}$Si-NMR measurements that the condensation rate α was 0.56. This analysis result revealed that most part of the present sol of silane coupling agent was linear in its structure.

Additionally, the remaining rate of acryloxypropyltrimethoxysilane as a raw material for the reaction was found to be 5% or below.

(Preparation of Hollow Fine Silica Sol Dispersion a)

To 500 parts of a hollow fine silica sol (an isopropyl-alcohol silica sol, having an average particle diameter of 60 nm and a shell thickness of 10 nm, a silica concentration of 20 mass %, containing silica particles with a refractive index of 1.31, and prepared according to the preparation example 4 in JP-A-2002-79616, except that the particle sizes were changed), 30 parts of acryloyloxypropyltrimethoxysilane (produced by Shin-Etsu Chemical Co., Ltd.) and 1.5 part of diisopropoxyaluminum ethylacetate were added, and they were mixed together. Thereto, 9 parts of ion-exchanged water was added. This admixture underwent reaction at 60° C. for 8 hours, then cooled to room temperature, and further admixed with 1.8 parts of acetyl acetone. This dispersion in an amount of 500 g was subjected to solvent displacement by performing reduced-pressure distillation at 20 kPa while adding cyclohexanone thereto so as to keep almost the same silica content. The dispersion prepared was free of extraneous matter, and its viscosity at 25° C. was 5 mPa·s as measured after adjustment of its solids concentration to 20 mass % by use of cyclohexanone. The proportion of residual isopropyl alcohol in Dispersion a thus prepared was found to be 1.5% by gas chromatographic analysis.

(1) Preparation of Coating Solution for Hard Coating Layer

| Composition of Coating Solution A-1 for Hard Coating Layer | |
| --- | --- |
| PET-30 | 46.0 parts by mass |
| Irgacure 184 | 1.7 parts by mass |
| P-2 | 0.06 parts by mass |
| Sol a-2 | 6.0 parts by mass |
| MiBK (methyl isobutyl ketone) | 14.0 parts by mass |
| MEK (methyl ethyl ketone) | 5.0 parts by mass |
| Composition of Coating Solution A-2 for Hard Coating Layer | |
| PET-30 | 50.0 parts by mass |
| Irgacure 184 | 2.0 parts by mass |
| SX-350 (30%) | 1.5 parts by mass |
| Cross-linked acrylic-styrene resin particles (30%) | 13.0 parts by mass |
| P-2 | 0.75 parts by mass |

-continued

| | |
|---|---|
| Sol a-2 | 9.5 parts by mass |
| Toluene | 38.5 parts by mass |
| Composition of Coating Solution A-3 for Hard Coating Layer | |
| PET-30 | 50.0 parts by mass |
| Irgacure 184 | 2.0 parts by mass |
| Cohesive silica (30%) | 15.0 parts by mass |
| P-2 | 0.06 parts by mass |
| Sol a-2 | 10.0 parts by mass |
| Toluene | 38.5 parts by mass |
| Composition of Coating Solution A-4 for Hard Coating Layer | |
| Cellulose acetate propionate | 3.6 parts by mass |
| Copolyester | 2.4 parts by mass |
| Tetrahydrofuran | 94 parts by mass |
| Composition of Coating Solution A-5 for Hard Coating Layer | |
| Acrylurethane | 36 parts by mass |
| PET-30 | 24.7 parts by mass |
| DPHA | 17.7 parts by mass |
| Methacrylic polymer | 21.3 parts by mass |
| Butyl acetate | 53.8 parts by mass |
| PMMA fine particles | 30 parts by mass |
| Irgacure 907 | 5 parts by mass |
| F407 | 0.5 parts by mass |
| n-Butanol | 142.13 parts by mass |
| Composition of Coating Solution A-6 for Hard Coating Layer | |
| PET | 46.0 parts by mass |
| Irgacure 184 | 1.7 parts by mass |
| P-2 | 0.06 parts by mass |
| Sol a-2 | 6.0 parts by mass |
| TINUVIN 328 | 10.0 parts by mass |
| MiBK (methyl isobutyl ketone) | 14.0 parts by mass |
| MEK (methyl ethyl ketone) | 5.0 parts by mass |
| Composition of Coating Solution A-7 for Hard Coating Layer | |
| PET-30 | 50.0 parts by mass |
| Irgacure 184 | 2.0 parts by mass |
| SX-350 (30%) | 1.5 parts by mass |
| Cross-linked acrylic-styrene resin particles (30%) | 13.0 parts by mass |
| P-2 | 0.75 parts by mass |
| Sol a-2 | 9.5 parts by mass |
| TINUVIN 327 | 10.0 parts by mass |
| Toluene | 38.5 parts by mass |
| Composition of Coating Solution A-8 for Hard Coating Layer | |
| PET-30 | 50.0 parts by mass |
| Irgacure 184 | 2.0 parts by mass |
| Cohesive silica (30%) | 15.0 parts by mass |
| P-2 | 0.06 parts by mass |
| Sol a-2 | 10.0 parts by mass |
| TINUVIN 320 | 10.0 parts by mass |
| Toluene | 38.5 parts by mass |
| Composition of Coating Solution A-9 for Hard Coating Layer | |
| Cellulose acetate propionate | 3.6 parts by mass |
| Copolyester | 2.4 parts by mass |
| TINUVIN 329 | 1.0 parts by mass |
| Tetrahydrofuran | 94 parts by mass |
| Composition of Coating Solution A-10 for Hard Coating Layer | |
| Acrylurethane | 36 parts by mass |
| PET-30 | 24.7 parts by mass |
| DPHA | 17.7 parts by mass |
| Methacrylic polymer | 21.3 parts by mass |
| Butyl acetate | 53.8 parts by mass |
| PMMA fine particles | 30 parts by mass |
| Irgacure 907 | 5 parts by mass |
| F407 | 0.5 parts by mass |
| TINUVIN 326 | 10.0 parts by mass |
| n-Butanol | 142.13 parts by mass |

The coating compositions described above were each passed through a polyethylene filter having a pore size of 30 µm, thereby preparing coating Solutions A-1 to A-10, respectively, for hard coating layer formation.

The ingredients used in the foregoing compositions are specified below.

PET-30: Mixture of pentaerythritol triacrylate and pentaerythritol tetraacrylate (produced by Nippon Kayaku Co., Ltd.)

Irgacure 184: Polymerization initiator (produced by Ciba Specialty Chemicals Inc.)

SX-350: Cross-linked polystyrene particles having an average size of 3.5 µm (produced by Soken Chemical & Engineering Co., Ltd., having a refractive index of 1.60, and used in the form of a 30% toluene dispersion after undergoing a dispersion operation for 20 minutes at 10,000 rpm by means of a polytron dispersing machine)

Cross-linked acrylic-styrene resin particles: A product of Soken Chemical & Engineering Co., Ltd. (having an average particle size of 3.5 µm and a refractive index of 1.55, and used in the form of a 30% toluene dispersion after undergoing a dispersion operation for 20 minutes at 10,000 rpm by means of a polytron dispersing machine)

P-2: Compound P-2 below, disclosed in JP-A-2006-206712

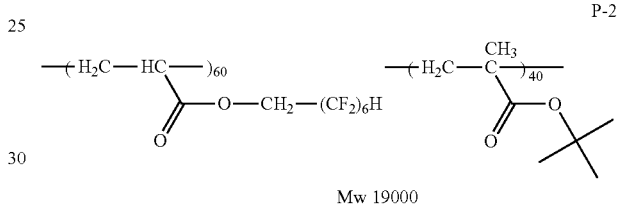

Mw 19000

Cohesive silica: Cohesive silica having a secondary grain size of 1.0 µm, produced by Nihon Silica Kogyo K.K.

Cellulose acetate propionate: CAP-482-20, produced by Eastman Chemical Company (acetylation degree: 2.5%, propylation degree: 46%, number average molecular weight calculated in terms of polystyrene, 75,000)

Copolyester: Fluorene-modified polyester, OPET (OP7-40, produced by Kanebo Ltd.)

THF: Tetrahydrofuran

Acrylurethane: A product obtained by reacting isocyanate groups of hydrogenated xylylene diisocyanate with hydroxyl groups of pentaerythritol acrylate DPHA: Mixture of dipentaerythritol hexaacrylate and dipentaerythritol pentaacrylate (produced by Nippon Kayaku Co., Ltd.)

Methacrylic polymer: That having hydroxyethyl groups and 2,3-dihydroxypropyl groups in its side chains PMMA fine particles: Those having an average particle size of 8.0 µm and a refractive index of 1.49

Irgacure 907: Polymerization initiator (produced by Ciba Specialty Chemicals Inc.)

F407: Leveling agent produced by Dainippon Ink and Chemicals, Incorporated

TINUVIN 320: 2-(3,5-Di-t-butyl-2-hydroxyphenyl)benzotri-azole, produced by Ciba Specialty Chemicals Inc.

TINUVIN 326: 2-(3-t-Butyl-5-methyl-2-hydroxyphenyl)-5-chlorobenzotriazole, produced by Ciba Specialty Chemicals Inc.

TINUVIN 327: 2,4-Di-t-butyl-6-(5-chlorobenzotriazole-2-yl)phenol, produced by Ciba Specialty Chemicals Inc.

TINUVIN 328: 2-(3,5-Di-t-amyl-2-hydroxyphenyl)benzotri-azole, produced by Ciba Specialty Chemicals Inc.

INYVIN 329: 2-(5-t-Octyl-2-hydroxyphenyl)benzotriazole, produced by Ciba Specialty Chemicals Inc.

(2) Preparation of Coating Solution for Low Refractive Index Layer

| Preparation of Coating Solution (LL-1) for Low Refractive Index Layer | |
|---|---|
| Thermally cross-linkable fluorine-containing polymer | 3.00 parts by mass |
| Cymel 303 | 0.75 parts by mass |
| Catalyst 4050 | 0.07 parts by mass |
| MEK-ST-L | 6.4 parts by mass |
| Sol a-1 | 5.8 parts by mass |
| MEK | 79.2 parts by mass |
| Cyclohexanone | 2.9 parts by mass |

The refractive index of the layer formed with this coating solution was found to be 1.44.

| Preparation of Coating Solution (LL-2) for Low Refractive Index Layer | |
|---|---|
| Thermally cross-linkable fluorine-containing polymer | 3.44 parts by mass |
| Cymel 303 | 0.86 parts by mass |
| Catalyst 4050 | 0.08 parts by mass |
| Hollow fine silica sol Dispersion a | 19.5 parts by mass |
| Sol a-1 | 3.4 parts by mass |
| MEK | 116.1 parts by mass |
| Cyclohexanone | 2.9 parts by mass |

The refractive index of the layer formed with this coating solution was found to be 1.39.

The foregoing ingredients are specified below,

Thermally cross-linkable fluoropolymer: The fluorine- and silicone-containing thermosetting polymer disclosed in Example 1 of JP-A-11-189621

Cymel 303: Curing agent (produced by Nihon Cytec Industries Inc.

Catalyst 4050: Curing catalyst (produced by Nihon Cytec Industries Inc.

MEK-ST-L: Colloidal silica dispersion (average particle size: 45 nm, solids concentration: 30%, a product of Nissan Chemical Industries, Ltd.

MEK: Methyl ethyl ketone (2) Application of Hard Coating Layer

While a roll of cycloolefin film coated with the easily-adhesive layer S1 was wound off, the S1-applied surface was coated directly with the coating solution A-1 for a hard coating layer at a transport speed of 30 nm/min in accordance with the coating method described in Example 1 of JP-A-2006-122889, then dried at 80° C. for 90 sec, and further irradiated with ultraviolet light in an illuminance of 400 mV/cm² and an exposure dose of 250 mJ/cm² by use of a 160 W/cm air-cooled metal halide lamp (made by Eyegraphics Co., Ltd.) under the atmosphere purged with nitrogen, thereby curing the coating layer, and thereafter wound into a roll. In the application of the coating solution A-1 for a hard coating layer, the gap between the downstream-side lip land and the web was changed to 80 μm, and the decompression degree in the decompression chamber was adjusted to 0.3 kPa. The amount of the coating solution applied was adjusted so that the hard coating layer after curing came to have the thickness value shown in Table 1.

(3) Application of Low Refractive Index Layer and Making of Polarizing Plate Protective Film While a roll of cycloolefin film coated with the easily-adhesive layer S1 and the hard coating layer A-1 was wound off, the hard coating layer-applied surface was coated directly with the coating solution LL-1 for a low refractive index layer at a transport speed of 30 m/min in accordance with the coating method described in Example 1 of JP-A-2006-122889, then dried at 90° C. for 120 sec, and further subjected to 10 minutes' heat curing at 120° C. For additional curing, the thus formed low refractive index layer was irradiated with ultraviolet light from a 160 W/cm air-cooled metal halide lamp (made by Eyegraphics Co., Ltd.) in an illuminance of 400 mV/cm² and an exposure dose of 250 mJ/cm² under the atmosphere purged with nitrogen. The thus formed polarizing plate protective film H1 was wound into a roll. In the application of the coating solution LL-1 for a low refractive index layer, the gap between the downstream-side lip land and the web was changed to 50 μm, and the decompression degree in the decompression chamber was adjusted to 0.5 kPa. The amount of the coating solution applied was adjusted so that the low refractive index layer after curing came to have a thickness of 100 nm.

<Undercoating for Polarizer>

The cycloolefin film was subjected to the following undercoating treatment on the side where a polarizer was to be bonded (the side opposite to the hard coating layer-applied side), and thereon an easily-adhesive layer and an undercoating layer were formed.

The cycloolefin film 1 was subjected to corona discharge treatment on the side opposite to the S1 coating, and thereto the following coating solution SS1 was applied so as to have a dry film thickness of 90 nm, thereby forming an easily-adhesive layer.

| Composition of Coating Solution SS1 for Easily-adhesive layer | |
|---|---|
| Styrene-butadiene latex (Solids content: 43% | 300 parts by mass |
| Sodium salt of 2,4-dichloro-6-hydroxy-s-triazine (8%) | 49 parts by mass |
| Distilled water | 1,600 parts by mass |

After the coating solution SS1 was applied and dried, the SS1 coating layer formed was further subjected to corona discharge treatment, and thereto the following coating solution (SS2) for a hydrophilic polymer layer was applied so as to have a dry thickness of 100 nm, thereby forming an undercoating layer. Thus, the polarizing plate protective film H1 was made. Characteristic evaluations were made on the polarizing plate protective film H1 thus made. Evaluation results obtained are shown in Table 1.

| Composition of Coating Solution SS2 for Undercoating Layer | |
|---|---|
| Gelatin | 30 parts by mass |
| Acetic acid (20%) | 20 parts by mass |
| Distilled water | 1,900 parts by mass |

<<Making of Polarizer>>

A 120-μm-thick polyvinyl alcohol film was immersed in an aqueous solution containing 1 parts by mass of iodine, 2 pas by mass of potassium iodide and 4 parts by mass of boric acid, and subjected to four-times stretching at 50° C., thereby making a polarizer.

(Another Polarizing Plate Protective Film)

An optically anisotropic layer-coated WV film (made by FUJIFILM Corporation) was immersed in a 1.5 mol/L aqueous sodium hydroxide solution kept at 55° C. for a period of 120 seconds, washed with water, and then dried.

<<Making of Polarizing Plate>>

The surface of the polarizing plate protective film H1 on the SS2-provided side and the surface of WV film on the side opposing to the optically anisotropic layer's side were stuck to both sides of the polarizer, respectively, by using an adhesive a 5% aqueous solution of fully-saponified polyvinyl alcohol, thereby making a polarizing plate 1. In addition, a polarizing plate T (HT) was made using a polarizing plate protective film T, namely a commonly used TAC (TD80, made by FUJIFILM Corporation), in place of the polarizing plate protective film H1. In this plate also, the protective film on the opposite side was the WV film.

<<Performance of Liquid Crystal Display Device>>

The polarizing plate provided on the display screen's side of a TN-mode liquid crystal cell-utilized liquid crystal display device (MRT-191S, manufactured by Mitsubishi Electric Corporation) was peeled away and, instead of that polarizing plate, the present polarizing plate 1 was stuck with a pressure-sensitive adhesive so that the cycloolefin film surface faced outward (the side of film-air interface), and besides, the transmission axis of the polarizing plate 1 corresponded to that of the polarizing plate originally attached to the manufactured product. In addition, the polarizing plate on the backlight side was also peeled away and, instead of that plate, the polarizing plate T was stuck with a pressure-sensitive adhesive so that its transmission axis corresponded to the transmission axis of the polarizing plate originally attached to the manufactured product. In a darkroom, the liquid crystal display device was switched on, and characteristics thereof were evaluated by visual observations from various viewing angles. Results obtained are shown in Table 2.

Examples 2 to 19 and Comparative Examples 1 to 3

Making of Polarizing Plate Protective Film (Polarizing Plate Protective Films H2 to H19)

As shown in Table 1, other polarizing plate protective films as substitutes for the polarizing plate protective film H1 in Example 1 were made in the following manners: Polarizing plate protective films H2 and H3 were made in the same manner as the polarizing plate protective film H1, except that the easily-adhesive layer coating solution was changed to S-2 and S-3, respectively. Polarizing plate protective films H4 to H7 and H9 to H13 were made in the same manner as the polarizing plate protective film H1, except that the hard coating layer coating solution was changed to A-2 to A-10, respectively. A polarizing plate protective film H8 was made in the same manner as the polarizing plate protective film H4, except that the hard coating layer coating solution A-1 was further applied by the same method. A polarizing plate protective film H14 was made in the same manner as the polarizing plate protective film H10, except that the hard coating layer coating solution A-6 was further applied by the same method. A polarizing plate protective film H15 was made in the same manner as the polarizing plate protective film H1, except that the low refractive index layer was changed to LL-2. A polarizing plate protective film H16 was made in the same manner as the polarizing plate protective film H1, except that the hard coating layer coating solution was changed to A-4 and the low refractive index layer was not provided. A polarizing plate protective film H17 was made in the same manner as the polarizing plate protective film H1, except that the easily-adhesive layer S1 was not coated. A polarizing plate protective film H18 was made in the same manner as the polarizing plate protective film H1, except that the cycloolefin film as the substrate was replaced by 80-μm-thick cellulose triacetate film (TD80, made by FUJIFILM Corporation). A polarizing plate protective film H19 was the cycloolefin film provided with neither the easily-adhesive layer, nor the hard coating layer, nor the low refractive index layer. The cellulose triacetate film is soluble in methyl ethyl ketone (relative dielectric constant, 18.5), so it falls into a category of films soluble in a solvent having a dielectric constant of 10 or more.

TABLE 1

| Polarizing plate protective film | Substrate | Easily-adhering layer | Hard coating layer Coating Solution | Hard coating layer Thickness (μm) | Low refractive index layer | Moisture permeability g/m² · 24 hr | Total haze % | Surface haze % | Internal haze % | Adhesion | Pencil hardness |
|---|---|---|---|---|---|---|---|---|---|---|---|
| H1 | Cycloolefin film | S1 | A-1 | 13 | LL-1 | 3.2 | 1 | 0.1 | 0.9 | A | 4 H |
| H2 | Cycloolefin film | S2 | A-1 | 13 | LL-1 | 3.1 | 1 | 0.1 | 0.9 | B | 4 H |
| H3 | Cycloolefin film | S3 | A-1 | 13 | LL-1 | 3.4 | 1 | 0.1 | 0.9 | A | 4 H |
| H4 | Cycloolefin film | S1 | A-2 | 5.5 | LL-1 | 3 | 45 | 7 | 38 | A | 3 H |
| H5 | Cycloolefin film | S1 | A-3 | 2.5 | LL-1 | 3.2 | 7 | 6 | 1 | A | 2 H |
| H6 | Cycloolefin film | S1 | A-4 | 3 | LL-1 | 3.3 | 4 | 3.5 | 0.5 | B | 2 H |
| H7 | Cycloolefin film | S1 | A-5 | 25 | LL-1 | 3.1 | 55 | 1 | 54 | A | 4 H |
| H8 | Cycloolefin film | S1 | A-2 + A-1 | 4 + 20 | LL-1 | 2.5 | 34 | 0.5 | 33.5 | A | 5 H |
| H9 | Cycloolefin film | S1 | A-6 | 13 | LL-1 | 3.2 | 1 | 0.1 | 0.9 | A | 4 H |
| H10 | Cycloolefin film | S1 | A-7 | 5.5 | LL-1 | 2.9 | 45 | 7 | 38 | A | 3 H |
| H11 | Cycloolefin film | S1 | A-8 | 2.5 | LL-1 | 3.3 | 7 | 6 | 1 | A | 2 H |
| H12 | Cycloolefin film | S1 | A-9 | 3.0 | LL-1 | 3.4 | 4 | 3.5 | 0.5 | A | 3 H |
| H13 | Cycloolefin film | S1 | A-10 | 25 | LL-1 | 3.1 | 55 | 1 | 54 | A | 4 H |
| H14 | Cycloolefin film | S1 | A-7 + A-6 | 4 + 20 | LL-1 | 2.1 | 34 | 0.5 | 33.5 | A | 5 H |
| H15 | Cycloolefin film | S1 | A-1 | 13 | LL-2 | 3.2 | 1 | 0.1 | 0.9 | A | 4 H |
| H16 | Cycloolefin film | S1 | A-4 | 3.0 | absent | 3.4 | 4 | 3.5 | 0.5 | A | 2 H |
| H17 | Cycloolefin film | absent | A-1 | 13 | LL-1 | 3.1 | 1 | 0.1 | 0.9 | C | 4 H |
| H18 | Cellulose triacetate film | S1 | A-1 | 13 | LL-1 | 1,300 | 1 | 0.1 | 0.9 | A | 4 H |
| H19 | Cycloolefin film | absent | absent | — | absent | 3.8 | 0 | 0 | 0 | — | HB |

The polarizing plate protective films 1 to 16 are polarizing plate protective films according to the invention, and the polarizing plate protective films 17 to 19 are polarizing plate protective turns as comparative examples.

In Table 1 are shown descriptions of the easily-adhesive layer, the hard coating layer and the low refractive index layer, which constitute each of the polarizing plate protective films 1 to 19, and data on moisture permeability, total haze, surface haze, internal haze, adhesion and pencil hardness of each polarizing plate protective film.

<<Making of Polarizing Plate>>
(Polarizing Plates 2 to 18 and Polarizing Plate T)

Polarizing plates 2 to 18 were made in the same manner as the polarizing plate 1, except that the polarizing plate protective film 1 was replaced by the polarizing plate protective films 2 to 19, respectively.

In addition, a polarizing plate T (HT) using the polarizing plate protective film T, or commonly used TAC (TD80, made by FUJIFILM Corporation), instead of the polarizing plate protective film 1 was also made. Herein, the protective film on the opposite side was the WV film.

(Polarizing Plate WV)

A polarizing plate WV (HWV) was made in the same maker as polarizing plate 1, except that the WV film was replaced by commonly used TAC (TD80, made by FUJIFILM Corporation).

(Polarizing Plate Z)

A polarizing plate Z (HZ) was made in the same manner as polarizing plate 1, except that the WV film was replaced by low-retardation TAC (Z-TAC, made by FUJIFILM Corporation: Re=1 nm, Rth=−3 nm).

<<Performance of Liquid Crystal Display Device>>

In accordance with the same methods as in Example 1, evaluations of extraneous light reflections, light leaks under high humidity and low humidity, and light stability of the viewing-side polarizing plate were performed on the liquid crystal display devices substituting the polarizing plates 2 to 19, respectively, for the polarizing plate 1 (Examples 1 to 16 and Comparative Examples 1 to 3, See Table 2.)

The polarizing plate provided on a VA-mode liquid crystal display device (LC-26GD3, manufactured by Sharp Corporation) was peeled away as its retardation firm was left and, instead of that polarizing plate, the present polarizing plate WV was stuck so that the cycloolefin film surface faced outward (the side of film-air interface), and besides, the transmission axis of the polarizing plate corresponded to that of the polarizing plate originally attached to the manufactured product.

The polarizing plate provided on an IPS-mode liquid crystal display device (Th-26LX300, manufactured by Matsushita Electric Industrial Co., Ltd.) was peeled away and, instead of that polarizing plate, the present polarizing plate Z was stuck so that the cycloolefin film surface faced outward (the side of film-air interface), and besides, the transmission axis of the polarizing plate corresponded to that of the polarizing plate originally attached to the manufactured product.

The polarizing plate provided on an IPS-mode liquid crystal display device (32LC100, manufactured by Toshiba Corporation) was peeled away in a condition that the retardation film on the front side was left and the retardation film on the rear side was peeled away and, instead of that polarizing plate, the present polarizing plate Z was stuck so that the cycloolefin film surface faced outward (the side of film-air interface), and besides, the transmission axis of the polarizing plate corresponded to that of the polarizing plate originally attached to the manufactured product.

On the thus modified liquid crystal display devices also, evaluations of extraneous light reflections, light leaks under high humidity and low humidity, and light stability of each individual viewing-side polarizing plate were performed (Examples 17 to 19, See Table 2).

Additionally, the polarizing plate 1 using the polarizing plate protective film H1 is indicated by a symbol H1 in Table 2. The symbols 12 to H19 indicated in Table 2 have meanings similar to the above.

TABLE 2

| | Liquid Crystal Cell | Combination of Polarizing Plates | | Unevenness in Perimeter | | Extraneous Light Reflections | Light Stability |
|---|---|---|---|---|---|---|---|
| | | Viewing Side | Backlight Side | 60° C.-90% RH, 50 hours | 70° C.-10% RH, 50 hours | | |
| Example 1 | MRT-191S | H1 | HT | A | A | B | B |
| Example 2 | MRT-191S | H2 | HT | A | A | B | B |
| Example 3 | MRT-191S | H3 | HT | A | A | B | B |
| Example 4 | MRT-191S | H4 | HT | A | A | B | B |
| Example 5 | MRT-191S | H5 | HT | A | A | B | B |
| Example 6 | MRT-191S | H6 | HT | A | A | B | B |
| Example 7 | MRT-191S | H7 | HT | A | A | B | B |
| Example 8 | MRT-191S | H8 | HT | A | A | B | B |
| Example 9 | MRT-191S | H9 | HT | A | A | B | A |
| Example 10 | MRT-191S | H10 | HT | A | A | B | A |
| Example 11 | MRT-191S | H11 | HT | A | A | B | A |
| Example 12 | MRT-191S | H12 | HT | A | A | B | A |
| Example 13 | MRT-191S | H13 | HT | A | A | B | A |
| Example 14 | MRT-191S | H14 | HT | A | A | B | A |
| Example 15 | MRT-191S | H15 | HT | A | A | A | B |
| Example 16 | MRT-191S | H16 | HT | A | A | C | B |
| Comparative Example 1 | MRT-191S | H17 | HT | A | A | B | B |
| Comparative Example 2 | MRT-191S | H18 | HT | C | C | B | B |
| Comparative Example 3 | MRT-191S | H19 | HT | A | A | D | B |

TABLE 2-continued

|  | Liquid Crystal Cell | Combination of Polarizing Plates | | Unevenness in Perimeter | | Extraneous Light Reflections | Light Stability |
|  |  | Viewing Side | Backlight Side | 60° C.-90% RH, 50 hours | 70° C.-10% RH, 50 hours | | |
|---|---|---|---|---|---|---|---|
| Example 17 | LC-26GD3 | HWV | HWV | A | A | B | B |
| Example 18 | TH-26LX300 | HZ | HZ | A | A | B | B |
| Example 19 | 32LC100 | HZ | HZ | A | A | B | B |

In each of Examples using the polarizing plates 1 to 16 provided with the polarizing plate protective films 1 to 16, respectively, which were polarizing plate protective films according to the invention, no light leak was caused under either of the high-humidity and low-humidity conditions, and each hard coating layer had good adhesiveness and high surface hardness, so these Examples were able to offer good-performance polarizing plate protective films, polarizing plates and liquid crystal display devices.

The polarizing plate protective film H17 formed by applying the hard coating layer without putting the easily-adhesive layer was poor in adhesion, so the liquid crystal display device made in Comparative Example 1 by using on the viewing side the polarizing plate 17 provided with the polarizing plate protective film H17 was susceptible to delamination of the hard coating layer on the viewing side.

In Comparative Example 2 using on the viewing side the polarizing plate 18 provided with the polarizing plate protective film 18 which had solubility in the solvent having a dielectric constant higher than 10 and great moisture permeability, light leaks occurred under both high-humidity and low-humidity conditions.

The liquid display device made in Comparative Example 3 by using on the viewing side the polarizing plate 3 provided with the polarizing plate protective film 3, which was poor in surface hardness because it was formed without application of any hard coating layer, tends to suffer abrasions on its surface because of its low surface hardness.

In Examples 9 to 14 using the polarizing plates 9 to 14 provided with the polarizing plate protective films H9 to H14 having the hard coating layers to which the ultraviolet agents were added, the light stability of these polarizing plates was higher than that of the other polarizing plates.

In Example 15 using the polarizing plate 15 provided with the polarizing plate protective film H15 having the low refractive index layer with a refractive index of 1.39, extraneous light reflections were on more satisfactory level because the polarizing plate 15 had lower reflectivity than the other polarizing plates.

In Example 16 using the polarizing plate 16 provided with the polarizing plate protective film 16 having no low refractive index layer, the reflectivity was high, so extraneous light reflections were somewhat perceivable, compared with those in Examples 1 to 14 where the low refractive index layer having a refractive index of 1.44 was formed.

The polarizing plate protective film H1 provided with the easily-adhesive layer S1 was higher in adhesion than the protective films H2 and H3 provided with the easily-adhesive layers S2 and S3, respectively, so the liquid crystal display device made in Example 1 by using on the viewing side the polarizing plate 1 provided with the polarizing plate protective film H1 was more resistant to delamination of the hard coating layer on the viewing side than the liquid crystal display devices made in Examples 2 and 3 by using on the viewing side the polarizing plates 2 and 3 provided with the polarizing plate protective films H2 and H3.

Examples 20 to 29 and Comparative Examples 4 to 9

(1) Preparation of Coating Solution for Hard Coating Layer

| Composition of Coating Solution A-11 for Hard Coating Layer | |
|---|---|
| PET-30 | 46.0 parts by mass |
| Irgacure 369 | 1.7 parts by mass |
| P-2 | 0.06 parts by mass |
| TINUVIN 320 | 2.5 parts by mass |
| MiBK (methyl isobutyl ketone) | 35.0 parts by mass |
| MEK (methyl ethyl ketone) | 7.5 parts by mass |

| Composition of Coating Solution A-12 for Hard Coating Layer | |
|---|---|
| PET-30 | 46.0 parts by mass |
| Irgacure 369 | 1.7 parts by mass |
| P-2 | 0.06 parts by mass |
| TINUVIN 328 | 2.5 parts by mass |
| MiBK (methyl isobutyl ketone) | 35.0 parts by mass |
| MEK (methyl ethyl ketone) | 7.5 parts by mass |

| Composition of Coating Solution A-13 for Hard Coating Layer | |
|---|---|
| PET-30 | 46.0 parts by mass |
| Irgacure 369 | 1.7 parts by mass |
| P-2 | 0.06 parts by mass |
| RUVA-93 | 2.5 parts by mass |
| MiBK (methyl isobutyl ketone) | 35.0 parts by mass |
| MEK (methyl ethyl ketone) | 7.5 parts by mass |

| Composition of Coating Solution A-14 for Hard Coating Layer | |
|---|---|
| PET-30 | 43.5 parts by mass |
| Irgacure 369 | 1.7 parts by mass |
| P-2 | 0.06 parts by mass |
| RUVA-93 | 2.5 parts by mass |
| TINUVIN 328 | 2.5 parts by mass |
| MiBK (methyl isobutyl ketone) | 35.0 parts by mass |
| MEK (methyl ethyl ketone) | 7.5 parts by mass |

| Composition of Coating Solution A-15 for Hard Coating Layer | |
|---|---|
| PET-30 | 48.5 parts by mass |
| Irgacure 369 | 1.7 parts by mass |
| P-2 | 0.06 parts by mass |
| MiBK (methyl isobutyl ketone) | 35.0 parts by mass |
| MEK (methyl ethyl ketone) | 7.5 parts by mass |

The foregoing coating solutions were each passed through a polypropylene filter having a pore size of 30 μm to prepare coating Solutions A-11 to A-15, respectively.

The compound used in the above compositions is specified below.

RUVA-93: 2-[2'-hydroxy-5'-(methacryloyloxy)ethylphenyl]-2H-benzotriazole (trade name, a product of Otsuka Chemical Co., Ltd.).

(2) Preparation of Coating Solution for Low Refractive Index Layer

| Preparation of Coating Solution (LL-3) for Low Refractive Index Layer | |
|---|---|
| Fluorine-containing polymer with ethylenically unsaturated groups (A-1) | 3.9 parts by mass |
| Silica dispersion A (22%) | 25.0 parts by mass |
| Irgacure 127 | 0.2 parts by mass |
| DPHA | 0.4 parts by mass |
| MEK | 100.0 parts by mass |
| MiBK | 45.5 parts by mass |

The coating solution having the foregoing composition was passed through a polypropylene filter having a pore size of 1 μm to prepare a coating solution. The low refractive layer formed by applying and curing the coating solution thus prepared had a refractive index of 1.36 after completion of curing.

The compounds used are specified below.

Fluorine-containing polymer with ethylenically unsaturated groups (A-1): Fluoropolymer
(A-1) Disclosed in Example 3 of JP-A-2005-89536

Silica Dispersion A:
To 500 g of a hollow fine silica sol (an isopropyl-alcohol sol of silica, having an average particle diameter of 60 nm, a shell thickness of 10 nm and a silica concentration of 20 mass %, containing silica particles with a refractive index of 1.31, and prepared according to Preparation Example 4 in JP-A-2002-79616, except that the particle sizes were changed), 10 g of acryloyloxypropyltrimethoxysilane produced by Shin-Etsu Chemical Co., Ltd.) and 1.0 g of diisopropoxyaluminum ethylacetate were added, and they were mixed together. Thereto, 3 g of ion-exchanged water was added. This mixture underwent reaction at 60° C. for 8 hours, then cooled to room temperature, and further admixed with 1.0 g of acetyl acetone. This dispersion in an amount of 500 g was subjected to solvent displacement by performing reduced-pressure distillation while adding cyclohexanone thereto so as to keep almost the same silica content. The dispersion prepared was free of extraneous matter, and its viscosity at 25° C. was 5 mPa·s as measured after adjustment of its solids concentration to 22 mass % by use of cyclohexanone. The proportion of residual isopropyl alcohol in Dispersion A thus prepared was found to be 1.0% by gas chromatographic analysis.

<<Making of Polarizing Plate Protective Film>>

Samples were made in the same manner as used for making the polarizing plate protective film H1 in Example 1, except that the kind of coating solution for the easily-adhesive layer and the thickness of the easily-adhesive layer, the kind and thickness of the hard coating layer and the kind of the low refractive index layer were changed as shown in Table 3. In order to cure each hard coating layer, irradiation with 250 mJ/cm$^2$ of ultraviolet rays was performed from the substrate side under purge by nitrogen in addition to the same ultraviolet irradiation from the hard coating layer-applied side as in Example 1. On the other hand, the curing of the low refractive index layer was carried out under the same curing conditions as in Example 1, except that the process of curing by heating at 120° C. for 10 minutes was omitted

TABLE 3

Film Evaluation

| Polarizing Plate Protective Film | Substrate | Easily-Adhering Layer | | Hard Coating Layer | | Low Refractive Index Layer | Moisture Permeability g/m$^2$·24 hr | Haze Increment by Cycle Thermal Aging | Adhesion | Pencil Hardness | Note |
|---|---|---|---|---|---|---|---|---|---|---|---|
| | | Coating Solution | Thickness (μm) | Coating Solution | Thickness (μm) | | | | | | |
| H20 | Cycloolefin Film | Nothing | — | A-15 | 14 | LL-3 | 3.2 | 0.2 | C | 4 H | Compartive Example |
| H21 | Cycloolefin Film | S1 | 0.5 | A-15 | 14 | LL-3 | 3.1 | 0.2 | A | 4 H | Invention |
| H22 | Cycloolefin Film | S2 | 0.5 | A-15 | 14 | LL-3 | 3.1 | 0.2 | B | 4 H | Invention |
| H23 | Cycloolefin Film | Nothing | — | A-11 | 14 | LL-3 | 3.2 | 4.0 | C | 4 H | Compar. Example |
| H24 | Cycloolefin Film | S1 | 0.5 | A-11 | 14 | LL-3 | 3.2 | 0.4 | A | 4 H | Invention |
| H25 | Cycloolefin Film | S2 | 0.5 | A-11 | 14 | LL-3 | 3.2 | 1.3 | B | 4 H | Invention |
| H26 | Cycloolefin Film | Nothing | — | A-11 | 14 | — | 3.2 | 6.0 | C | 4 H | Compar. Example |
| H27 | Cycloolefin Film | Nothing | — | A-12 | 14 | LL-3 | 3.1 | 2.1 | C | 4 H | Compar. Example |
| H28 | Cycloolefin Film | S1 | 0.5 | A-12 | 14 | LL-3 | 3.1 | 0.4 | A | 4 H | Invention |
| H29 | Cycloolefin Film | S2 | 0.5 | A-12 | 14 | LL-3 | 3.2 | 0.9 | B | 4 H | Invention |
| H30 | Cycloolefin Film | Nothing | — | A-13 | 14 | LL-3 | 3.2 | 1.3 | C | 4 H | Compartive Example |
| H31 | Cycloolefin Film | S1 | 0.5 | A-13 | 14 | LL-3 | 3.1 | 0.2 | A | 4 H | Invention |
| H32 | Cycloolefin Film | S2 | 0.5 | A-13 | 14 | LL-3 | 3.1 | 0.9 | B | 4 H | Invention |

TABLE 3-continued

Film Evaluation

| Polarizing Plate Protective Film | Substrate | Easily-Adhering Layer Coating Solution | Easily-Adhering Layer Thickness (μm) | Hard Coating Layer Coating Solution | Hard Coating Layer Thickness (μm) | Low Refractive Index Layer | Moisture Permeability g/m² · 24 hr | Haze Increment by Cycle Thermal Aging | Adhesion | Pencil Hardness | Note |
|---|---|---|---|---|---|---|---|---|---|---|---|
| H33 | Cycloolefin Film | Nothing | — | A-14 | 14 | LL-3 | 3.2 | 2.2 | C | 4 H | Compartive Example |
| H34 | Cycloolefin Film | S1 | 0.5 | A-14 | 14 | LL-3 | 3.2 | 0.2 | A | 4 H | Invention |
| H35 | Cycloolefin Film | S2 | 0.5 | A-14 | 14 | LL-3 | 3.1 | 0.9 | B | 4 H | Invention |

<<Making of Polarizing Plate>>
(Polarizing Plates 2 to 18 and Polarizing Plate T)

Polarizing plates were made in the same manner as the polarizing plate 1, except that the polarizing plate protective film 1 was replaced with the polarizing plate protective films shown in Table 4, respectively. The polarizing plates made were each evaluated in accordance with the methods adopted in Example 1. In addition to the evaluations made in Example 1, the following durability evaluation was performed on each of the polarizing plate protective films.

<Haze Evaluation after Nigh Humidity-Low Humidity Cycle Thermal Aging (Evaluation of Haze Increment by Cycle Thermal Aging)>

A process of storing a polarizing plate protective film for 10 hours under conditions of 60° C. and 90% RH, then 2 hours under conditions of 25° C. and 55% RH, then for 10 hours under conditions of 70° C. and 10% RH, and then for 2 hours under conditions of 25° C. and 55% RH is defined as one cycle, and this process is repeated 4 times. Before and after this cycle thermal aging process, the total haze measurements of the polarizing plate protective film are made, and the value (ΔH) as deduction of the haze value before the cycle thermal aging from the haze value after the cycle thermal aging is determined. The ΔH value closer to zero signifies the higher durability. In such uses as great changes in environmental conditions occur during use and high durability is required, the ΔH value is controlled preferably to 2.0 or below, far preferably to 1.0 or below.

Evaluation results obtained are shown in Table 3 and Table 4.

Additionally, the polarizing plate 20 using the polarizing plate protective film H20 is indicated by a symbol H20 in Table 4. The symbols H21 to H35 indicated in Table 4 have meanings similar to the above.

TABLE 4

| Sample No. | Liquid Crystal Cell | Combination of Polarizing Plates Viewing Side | Combination of Polarizing Plates Backlight Side | Unevenness in Perimeter 60° C.-90% RH, 50 hours | Unevenness in Perimeter 70° C.-10% RH, 50 hours | Extraneous Light Reflections | Light Stability |
|---|---|---|---|---|---|---|---|
| Comparative Example 4 | MRT-191S | H20 | HT | A | A | A | B |
| Example 20 | MRT-191S | H21 | HT | A | A | A | B |
| Example 21 | MRT-191S | H22 | HT | A | A | A | B |
| Comparative Example 5 | MRT-191S | H23 | HT | A | A | A | B |
| Example 22 | MRT-191S | H24 | HT | A | A | A | A |
| Example 23 | MRT-191S | H25 | HT | A | A | A | A |
| Comparative Example 6 | MRT-191S | H26 | HT | A | A | D | B |
| Comparative Example 7 | MRT-191S | H27 | HT | A | A | A | B |
| Example 24 | MRT-191S | H28 | HT | A | A | A | A |
| Example 25 | MRT-191S | H29 | HT | A | A | A | A |
| Comparative Example 8 | MRT-191S | H30 | HT | A | A | A | A |
| Example 26 | MRT-191S | H31 | HT | A | A | A | A |
| Example 27 | MRT-191S | H32 | HT | A | A | A | A |
| Comparative Example 9 | MRT-191S | H33 | HT | A | A | A | A |
| Example 28 | MRT-191S | H34 | HT | A | A | A | A |
| Example 29 | MRT-191S | H35 | HT | A | A | A | A |

As can be seen from Table 4, the present polarizing plate protective films having easily-adhesive layers were superior in adhesion under the hard coating layer-laminated condition. In addition, it can be seen that the present polarizing plates had less unevenness in perimeter and higher light stability when the ultraviolet absorbents were incorporated in the hard coating layers. Moreover, it is shown that, although the addition of the ultraviolet absorbents to the hard coating layers exacerbated the durability of the polarizing plate protective films under the cycle thermal aging, durability improvement was produced by incorporation of the specified latex in the easily-adhesive layer or by use of the ultraviolet absorbent with the polymerizable functional group.

This application claims foreign priority from Japanese Patent Application No. 2006-291349) filed Oct. 26, 2006, the entire disclosure of which is herein incorporated by reference.

What is claimed is:

1. A polarizing plate comprising in the following order:
   a protective film comprising a hard coating layer, a first easily-adhesive layer and a first transparent substrate insoluble in a solvent having a dielectric constant of 10 or more, which are formed in that order and in direct contact with one another;
   a polarizer on an opposite side of the protective film to a side having the hard coating layer; and
   a second transparent substrate,
   wherein the first transparent substrate comprises a cycloolefin film, and at least one of the hard coating and easily adhesive layers contains an ultraviolet absorbent,
   wherein the first easily-adhesive layer comprises a copolymer latex, said copolymer latex comprising at least one member selected from the group consisting of an acrylic acid ester latex, a methacrylic acid latex, and a styrene latex, and
   wherein the copolymer latex is obtained by polymerization from:
   (a) a diolefin monomer;
   (b) a vinyl monomer selected from an acrylic acid ester, a methacrylic acid ester, styrene and a styrene derivative;
   (c) at least one kind of monomer having two or more vinyl, acryloyl, methacryloyl or allyl groups per molecule; and
   (d) polymerization chain transfer agents including an α-methylstyrene dimer.

2. The polarizing plate of claim 1, wherein the diolefin monomer comprises butadiene.

3. The polarizing plate of claim 1, wherein, in the copolymer latex, a content of the diolefin monomer (a) is 10 to 60% by mass, a content of vinyl monomer (b) is 40 to 90% by mass, a content of the monomer (c) is 0.01 to 10% by mass of the total of (a) and (b), and a content of the polymerization chain transfer agents (d) is 0.3 to 10% by mass of the total of (a), (b) and (c).

4. The polarizing plate of claim 1, wherein the first easily adhesive layer further contains a dichloro-s-triazine crosslinking agent.

* * * * *